US012591372B2

(12) United States Patent
Kim

(10) Patent No.: US 12,591,372 B2
(45) Date of Patent: Mar. 31, 2026

(54) MEMORY CONTROLLER, STORAGE DEVICE INCLUDING MEMORY CONTROLLER, AND OPERATING METHOD OF MEMORY CONTROLLER

(71) Applicant: Samsung Electronics Co., Ltd., Suwon-si (KR)

(72) Inventor: Hyunsub Kim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 18/603,588

(22) Filed: Mar. 13, 2024

(65) Prior Publication Data

US 2024/0311020 A1 Sep. 19, 2024

(30) Foreign Application Priority Data

Mar. 16, 2023 (KR) ........................ 10-2023-0034664

(51) Int. Cl.
 *G06F 12/00* (2006.01)
 *G06F 3/06* (2006.01)
(52) U.S. Cl.
 CPC ............ *G06F 3/0619* (2013.01); *G06F 3/064* (2013.01); *G06F 3/0656* (2013.01); *G06F 3/0679* (2013.01)
(58) Field of Classification Search
 None
 See application file for complete search history.

(56) References Cited

U.S. PATENT DOCUMENTS 6,947,956 B2 9/2005 Olstad et al.
7,679,133 B2 3/2010 Son et al.

7,873,865 B2 1/2011 Okada et al.
7,966,354 B2 6/2011 Ichikawa et al.
8,553,466 B2 10/2013 Han et al.
8,559,235 B2 10/2013 Yoon et al.
8,654,587 B2 2/2014 Yoon et al.
9,927,985 B2 3/2018 Zhang et al.

(Continued)

FOREIGN PATENT DOCUMENTS

KR 10-2016-0064364 A 6/2016
KR 10-2022-0086934 A 6/2022

OTHER PUBLICATIONS

Extended European Search Report dated Jun. 20, 2024 issued in corresponding European Appln. No. 24163544.0.

*Primary Examiner* — Daniel D Tsui

(74) *Attorney, Agent, or Firm* — Harness, Dickey & Pierce, P.L.C.

(57) ABSTRACT

A storage device includes a non-volatile memory device, a buffer memory configured to store a plurality of meta data blocks and journal data corresponding to the plurality of meta data blocks, the journal data includes a plurality of journal entries indicating update information on the meta data included in one of the plurality of meta data blocks, and a memory controller configured to determine a recovery time of the plurality of meta data blocks based on journal times corresponding to each of the journal entries, the recovery time being a predicted time for recovering the plurality of meta data blocks using the journal data, and perform a meta writing based on the recovery time, the meta writing including writing one of the plurality of meta data blocks to the non-volatile memory device and writing the journal data to the non-volatile memory device.

20 Claims, 23 Drawing Sheets

<u>10</u>

(56)     References Cited

U.S. PATENT DOCUMENTS

| | | | |
|---|---|---|---|
| 10,936,247 | B2 | 3/2021 | Kang |
| 11,704,281 | B2 | 7/2023 | Yang |
| 2011/0233648 | A1 | 9/2011 | Seol et al. |
| 2016/0154594 | A1 | 6/2016 | Kang |
| 2020/0117389 | A1* | 4/2020 | Kang .................... G06F 3/0656 |
| 2020/0226038 | A1* | 7/2020 | Peltz .................... G06F 3/0679 |
| 2022/0214817 | A1* | 7/2022 | Ha ...................... G06F 11/1441 |

* cited by examiner

FIG. 15

Cost Table

| | Opcode | Meta Type | Meta Length (L$_{META}$) | Access Length (L$_{WIDTH}$) | Cost |
|---|---|---|---|---|---|
| JNLa | Store | PPN | 35-bit | 32 | 2 |
| JNLb | Store | IVS | 4-bit | | 1 |
| JNLc | BitSet | IBM,VPB | 1-bit | | 1 |
| JNLd | BitClear | IBM,VPB | 1-bit | | 1 |
| JNLe | Trim | IBM_start~IBM_end | IBM_end~IBM_start | | (IBM_end~IBM_start) / 32 |

MEMORY CONTROLLER, STORAGE DEVICE INCLUDING MEMORY CONTROLLER, AND OPERATING METHOD OF MEMORY CONTROLLER

CROSS-REFERENCE TO RELATED APPLICATION

This U.S. non-provisional application claims the benefit of priority under 35 U.S.C. § 119 to Korean Patent Application No. 10-2023-0034664, filed on Mar. 16, 2023, in the Korean Intellectual Property Office, the disclosure of which is incorporated by reference herein in its entirety.

BACKGROUND

1. Field

Various example embodiments of the inventive concepts relate to journaling of a storage device, and more specifically, to a memory controller performing journaling, a storage device including the memory controller, an operating method of the memory controller, and/or a non-transitory computer readable medium storing instructions to perform the operating method.

2. Description of the Related Art

As a type of non-volatile memory, a flash memory may maintain stored data even when power thereto is cut off. Recently, storage devices including flash memories, such as solid state drives (SSDs) and memory cards, have been widely used. A storage device uses meta data for managing non-volatile memory. Accordingly, technology for efficiently managing meta data is desired and/or required to improve the performance of a storage device.

SUMMARY

Provided are a memory controller that manages a journal to maintain an open time of a storage device within a desired and/or certain level while decreasing and/or minimizing the performance degradation of the storage device, the storage device including the memory controller, an operating method of the memory controller, and/or a non-transitory computer readable medium storing instructions to perform the operating method of the memory controller.

Additional aspects will be set forth in part in the description which follows and, in part, will be apparent from the description, or may be learned by practice of various example embodiments of the inventive concepts.

According to at least one example embodiment, a storage device includes a non-volatile memory device, a buffer memory configured to store a plurality of meta data blocks and journal data corresponding to the plurality of meta data blocks, the plurality of meta data blocks including meta data for managing the non-volatile memory device, and the journal data includes a plurality of journal entries indicating update information on the meta data included in one of the plurality of meta data blocks, and a memory controller configured to determine a recovery time of the plurality of meta data blocks based on journal times corresponding to each of the journal entries, the recovery time being a predicted time for recovering the plurality of meta data blocks using the journal data, and perform a meta writing based on the recovery time, the meta writing including writing one of the plurality of meta data blocks to the non-volatile memory device and writing the journal data to the non-volatile memory.

According to at least one example embodiment, a memory controller for controlling a non-volatile memory device includes processing circuitry configured to, update first meta data included in at least one of a plurality of meta data blocks based on at least one memory operation performed by the non-volatile memory device, generate a first journal entry including update information in response to the updating of the first meta data, update based on a first journal time corresponding to the first journal entry, the recovery time being a predicted time for recovering the plurality of meta data blocks based on journal data including a plurality of journal entries, and perform meta writing in response to the updated recovery time reaching a threshold value, the meta writing including writing one of the plurality of meta data blocks stored in a buffer memory and the journal data to the non-volatile memory device.

According to at least one example embodiment, an operating method of a memory controller for controlling a non-volatile memory device includes loading a plurality of meta data blocks into a buffer memory, updating meta data included in at least one of the plurality of meta data blocks, generating a journal entry that represents update information corresponding to the updated meta data, updating a recovery time based on a first journal time corresponding to the journal entry, the recovery time being a predicted time for recovering the plurality of meta data blocks based on journal data including the journal entry, and writing one of the plurality of meta data blocks to the non-volatile memory device and the journal data to the non-volatile memory device in response to the updated recovery time reaching a threshold value.

According to at least one example embodiment, a storage device includes a non-volatile memory device, a buffer memory configured to store a plurality of meta data blocks and journal data corresponding to the plurality of meta data blocks, the plurality of meta data blocks including meta data for managing the non-volatile memory device, and the journal data includes a plurality of journal entries indicating update information on the meta data included in one of the plurality of meta data blocks, and a memory controller configured to calculate a recovery cost for recovering the plurality of meta data blocks based on the journal data, and write one of the plurality of meta data blocks and the journal data to the non-volatile memory device in response to the recovery cost reaching a threshold value.

BRIEF DESCRIPTION OF THE DRAWINGS

The above and other aspects, features, and advantages of various example embodiments of the inventive concepts will be more apparent from the following description taken in conjunction with the accompanying drawings, in which:

FIG. 15 illustrates a cost table according to at least one example embodiment;

FIG. 17 is a diagram illustrating a 3D VNAND structure applicable to a storage device according to at least one example embodiment; and FIG. 18 is a diagram illustrating a B-VNAND structure applicable to a storage device according to at least one example embodiment.

DETAILED DESCRIPTION

Figure 1:
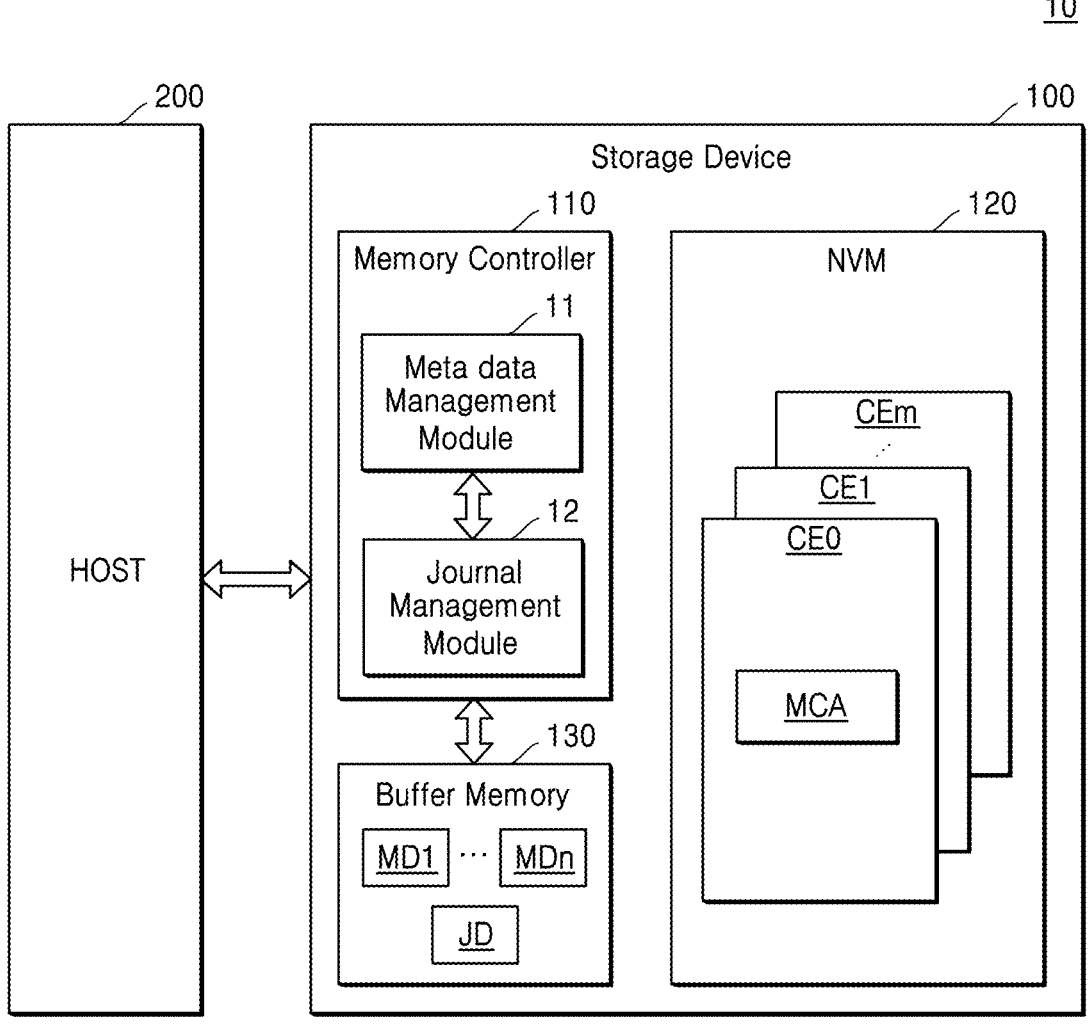
FIG. 1 is a block diagram illustrating a storage system according to at least one example embodiment.

Reference will now be made in detail to various example embodiments, examples of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, various example embodiments will be described in detail with reference to the accompanying drawings.

FIG. 1 is a block diagram illustrating a storage system 10 according to at least one example embodiment.

The storage system 10 may be embedded in an electronic device and/or implemented as an electronic device, but is not limited thereto. The electronic device may be implemented, for example, as a personal computer (PC), a data server, a network-attached storage (NAS), an Internet of Things (IoT) device, and/or a portable electronic device, etc. Portable electronic devices may be laptop computers, mobile phones, smartphones, tablets, other smart devices, personal digital assistants (PDAs), enterprise digital assistants (EDAs), digital still cameras, digital video cameras, audio devices, portable multimedia players (PMPs), personal navigation devices (PNDs), MP3 players, handheld game consoles, e-books, wearable devices, vehicles, drones, etc.

Referring to FIG. 1, the storage system 10 may include a storage device 100 and/or at least one host 200 (e.g., a host device), etc., but is not limited thereto.

The host 200 may refer to a data processing device capable of processing data, such as a central processing unit (CPU), a processor, a microprocessor, and/or an application processor (AP), etc. The host 200 may execute at least one operating system (OS) and/or various applications. For example, the host 200 may be implemented as an AP and/or a system-on-a-chip (SoC), may include a plurality of processors, a distributed processing system, a cloud processing system, etc. In addition, for example, the host 200 may be implemented as an integrated circuit, a motherboard, and/or a database server, etc., but is not limited thereto.

The host 200 may store data in the storage device 100 and/or read data from the storage device 100. The host 200 transmits to the storage device 100 at least one command requesting at least one data processing operation of the storage device 100 and/or data, and the storage device 100 may operate in response to the command.

The host 200 may communicate with the storage device 100 through various interface protocols. For example, the host 200 may communicate with the storage device 100 by using an interface, such as a Peripheral Component Interconnect-Express (PCI-E) interface, an Advanced Technology Attachment (ATA) interface, a Serial ATA (SATA) interface, a Parallel Architecture (PATA) interface, and/or a Serial Attached SCSI (SAS) interface, but is not limited thereto. In addition, various other interfaces, such as a Universal Flash Storage (UFS) interface, a Universal Serial Bus (USB) interface, a Multi-Media Card (MMC) interface, an Enhanced Small Disk Interface (ESDI) interface, and/or an Integrated Drive Electronics (IDE) interface, etc., may be applied as interfaces between the host 200 and the storage device 100. In at least one example embodiment, the host 200 may be connected to the storage device 100 according to an interface protocol defined in the SATA and/or PCI-E standard, and accordingly, the storage device 100 may be a solid state drive (SSD) device and the host 200 may be an SSD host, but the example embodiments are not limited thereto. However, the some example embodiments are not limited thereto, and the storage device 100 and the host 200 may be connected to one another according to various standard interfaces.

The storage device 100 may include a memory controller 110, a non-volatile memory 120, and/or a buffer memory 130, etc. In some example embodiments, the storage device 100 may be an internal memory embedded in an electronic device, but is not limited thereto. For example, the storage device 100 may be an SSD, an embedded multimedia card (eMMC), and/or an embedded UFS memory device, etc. In some example embodiments, the storage device 100 may be an external memory detachable from the electronic device. For example, the storage device 100 may be a UFS memory card, a Compact Flash (CF) memory, a Secure Digital (SD) memory, a Micro Secure Digital (Micro-SD) memory, a Mini Secure Digital (Mini-SD) memory, an extreme Digital (xD) memory, and/or a memory stick, etc.

The non-volatile memory 120 (or referred to as a non-volatile memory device) may store data. For example, the non-volatile memory 120 may store data received with a write request from the host 200. In addition, the non-volatile memory 120 may store computer readable instructions, such as firmware, software, program code, etc., for controlling the operation of the storage device 100 by executing the computer readable instructions in the memory controller 110, and/or data, for example, meta data, generated by managing the non-volatile memory 120 by the memory controller 110, etc.

The non-volatile memory 120 may include a plurality of memory devices CE0 to CEm (e.g., a plurality of memory chips), but is not limited thereto. The plurality of memory devices CE0 to CEm may include different channels or ways. Each of the plurality of memory devices CE0 to CEm may include a memory cell array MCA. In at least one example embodiment, the memory cell array MCA may include a three-dimensional (3D) memory cell array, and the 3D memory cell array may include a plurality of NAND strings, but the example embodiments are not limited thereto. Each NAND string may include memory cells connected to word lines vertically stacked on a substrate. U.S. Patent Publication Nos. 7,679,133, 8,553,466, 8,654, 587, 8,559,235, and U.S. Patent Application Publication No. 2011/0233648 are incorporated by reference herein in their entireties. In at least one example embodiment, the memory cell array MCA may include a two-dimensional (2D) memory cell array, and the 2D memory cell array may include a plurality of NAND strings arranged in a row direction and a column direction.

In at least one example embodiment, the memory cell array MCA may include a plurality of memory blocks, each of the plurality of memory blocks may include a plurality of pages, and each of the plurality of pages may include a plurality of memory cells. Here, a page may be a write unit and the memory block may be an erase unit, but the example embodiments are not limited thereto. The memory cells may include a single level cell (SLC) capable of storing one data bit, a multi level cell (MLC) capable of storing two data bits, a triple level cell (TLC) capable of storing three data bits, and/or a quad level cell (QLC) capable of storing four data bits, etc.

In one configuration, the non-volatile memory 120 may include a flash memory device, for example, a NAND flash memory device. However, the example embodiments are not limited thereto, and the non-volatile memory 120 may include resistive memory devices, such as resistive RAM (ReRAM), phase change RAM (PRAM), and/or magnetic RAM (MRAM), etc. Hereinafter, in the example embodiments, it is assumed that the non-volatile memory 120 is a flash memory device, but the example embodiments are not limited thereto.

The memory controller 110 (and/or a storage controller) may control the non-volatile memory 120 and/or the buffer memory 130 to write data to the non-volatile memory 120 in response to a write request from the host 200 and/or to read data stored in the non-volatile memory 120 in response to a read request from the host 200, but the example embodiments are not limited thereto, and for example, other data operations may be performed, such as an erase operation, a load leveling operation, etc. In at least one example embodiment, the memory controller 110 may include a meta data management module 11 and/or a journal management module 12, etc., but the example embodiments are not limited thereto. According to some example embodiments, the memory controller 110, the meta data management module 11, and/or the journal management module 12, etc., may be implemented as processing circuitry. The processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

When power is supplied to the storage device 100, the memory controller 110 loads the meta data stored in the non-volatile memory 120 to the buffer memory 130, and controls a write and/or read operation (e.g., data operation, memory operation, etc.) of the non-volatile memory 120 and/or a memory space of the non-volatile memory 120 based on the meta data. In at least one example embodiment, the non-volatile memory 120 may store a plurality of meta data blocks each containing meta data, such as first to n-th meta data blocks MD1 to MDn, and the first to n-th meta data blocks MD1 to MDn may be sequentially loaded into the buffer memory 130.

The meta data may include mapping information used to convert a logical address received from the host 200 to a physical address of the non-volatile memory 120, for example, a logical address to physical address (L2P) map, etc. In addition, the meta data may include information for managing the memory space of the non-volatile memory 120, for example, the number of writes indicating how many pages are written, physical page information indicating the validity of the data stored in each page, and the like. For example, the memory controller 110 may convert a logical address received from the host 200 into a physical address of the non-volatile memory 120 by using the meta data.

The memory controller 110 may update meta data changed according to and/or based on an operation after the operation is performed in response to the request from the host 200. The meta data management module 11 may manage generation and/or update of meta data, etc. For example, when a physical address for a logical address is changed according to and/or based on a write operation, the meta data management module 11 may update the meta data by changing the mapping information based on a physical address newly mapped to the logical address in response to the performed write operation, etc. The updated meta data may be stored in the buffer memory 130.

The memory controller 110 may generate at least one journal log (e.g., journal entry) based on an update of the meta data, etc. The journal log (e.g., journal entry) may store update information indicating a change, modification, update, etc., in the meta data, but is not limited thereto. In other words, the journal log may include information desired and/or necessary to restore changes to the meta data. In one configuration, the journal log may include information on the type of operation in which a change in the meta data has occurred, and data and/or substantial data to restore a change in the meta data. The information on the type of operation in which the change of the meta data has occurred may include information defining and/or identifying operation types for various operations capable of changing meta data, such as a program operation, a block allocation operation, a page copy operation, and the like. In addition, practical data for restoring changes in the meta data may include logical addresses, old physical addresses, new physical addresses, etc.

The journal management module 12 may generate and manage one or more journal logs (e.g., journal entries) in response to an update of meta data. For example, the journal management module 12 may generate at least one journal log and store the same in the buffer memory 130, and may determine whether to write journal data JD including a plurality of journal logs stored in the buffer memory 130 into the non-volatile memory 120, etc.

The memory controller 110 may write one of the first to n-th meta data blocks MD1 to MDn and/or journal data JD into the non-volatile memory 120 during the run-time of the storage device 100 and/or when the storage device 100 is powered off, which may be referred to as "meta writing." When meta writing is performed, the journal data JD may be flushed (e.g., the journal data JD may be written to the non-volatile memory 120, etc.), but the example embodiments are not limited thereto. The journal management module 112 may determine whether to perform meta writing during the run-time of the storage device 100.

The journal management module 112 may determine whether to perform meta writing based on a time which is expected to be taken to recover the lost meta data of at least one meta data block loaded into the buffer memory 130 based on the journal data JD at an open time, that is to say, the "recovery time" corresponding to the journal data JD. Here, the "open time" represents the time from the state the storage device 100 is powered on to the state in which the data input/output operation may be processed, and may be referred to as a "ready to" time.

The journal management module 112 may calculate and/or update the recovery time corresponding to the journal data JD by calculating and accumulating the journal time expected to be taken to replay (e.g., review, analyze, etc.) a journal log every time the journal log is generated. When the recovery time thereof is greater than or equal to a threshold value (e.g., a desired threshold value), the journal management module 112 may determine that the memory controller 110 performs meta writing. Here, the threshold value may be set below the "meta loading period" desired and/or required for one meta data block and journal data JD to be loaded into the buffer memory 130 from the non-volatile memory 130 at an open time.

After the storage device 100 is powered-on, the memory controller 110 may load and/or sequentially load, to the buffer memory 130, the first to n-th meta data blocks MD1 to MDn stored in the non-volatile memory 120, and when the meta data block is loaded, the memory controller 110 may load the meta data block together with the meta-written journal data JD into the buffer memory 130, but the example embodiments are not limited thereto.

When the current meta data block and current journal data are loaded into the buffer memory 130, recovery of meta data based on previous journal data, e.g., the journal data just loaded into the buffer memory 130, may be performed. In this case, after the recovery of meta data based on the previous journal data is completed, the next meta data block and the next journal data may be loaded into the buffer memory 130. By managing the journal data JD so that the recovery time corresponding to the journal data JD is less than or equal to the meta loading period, the journal management module 12 may decrease and/or prevent occurrence of stalls (e.g., processor stalls, etc.) between meta loadings due to the recovery of the meta data.

The buffer memory 130 may store a plurality of meta data blocks MD1 to MDn and/or journal data JD corresponding to the plurality of meta data blocks MD1 to MDn. Here, the meta data block may be a unit which is loaded and written together with the journal data JD when being loaded from the non-volatile memory 120 to the buffer memory 130 and written into the non-volatile memory 120. Each of the plurality of meta data blocks MD1 to MDn may include at least one piece of meta data. The journal data JD may include a plurality of journal logs (e.g., journal entries), and each journal log (e.g., journal entry) may be generated in response to a change in meta data included in one of the plurality of meta data blocks MD1 to MDn. The buffer memory 130 will be described in more detail with reference to FIG. 2.

As illustrated in FIG. 1, the buffer memory 130 may be implemented as an internal memory in the memory controller 110. However, the example embodiments are not limited thereto, and in some example embodiments, the buffer memory 130 may be implemented as an external memory implemented outside the memory controller 110. In other words, the buffer memory 130 may be implemented as a memory chip outside (e.g., external to) a controller chip where the memory controller 110 is implemented, for example, a dynamic random access memory (DRAM) chip, but is not limited thereto. In some example embodiments, the buffer memory 130 may be implemented as a combination of internal memory and external memory in the memory controller 110, etc.

When a Sudden Power Off (SPO) occurs in the storage device 100, the storage device 100 may perform an SPO operation using an internal power source (e.g., capacitor power, etc.). In this case, the capacity of a plurality of pieces of meta data stored in the buffer memory 130, such as the first to n-th meta data blocks MD1 to MDn, is relatively large, and thus, may not be flushed to the non-volatile memory 120. For example, one of the first to n-th meta data blocks MD1 to MDn may be stored in the non-volatile memory 120. Accordingly, some of the first to n-th meta data blocks MD1 to MDn stored in the non-volatile memory 120 may not be the latest version, and in this case, some information of meta data contained in the meta data blocks other than the latest version may be lost. Since the journal data JD managed by the journal management module 12 has a relatively small capacity, the journal data JD may be flushed to the non-volatile memory 120 in response to a random power off event. During an open operation following a power-on after a sudden power-off event, the memory controller 110 may replay and/or sequentially replay the journal data JD stored in the buffer memory 130 and the journal data JD previously stored in the buffer memory 130, thereby recovering lost meta data.

The more frequent the meta writing during the run-time of the storage device 100 is, the less the amount of journal data (JD) to be written to the storage device 100 and the shorter the open time, but the more frequent the access to the non-volatile memory 120 is, the lower the performance of the storage device 100.

As described above, the storage device 100 according to at least one example embodiment may calculate and accumulate journal times corresponding to a plurality of journal logs included in the journal data JD to calculate the recovery time corresponding to the journal data JD and may perform meta writing when the recovery time thereof is greater than or equal to a threshold value. In other words, the storage device 100 may determine whether to perform meta writing based on the recovery time corresponding to the journal data JD, not the amount of journal data JD. By managing the journal data JD so that the recovery time is less than or equal to the meta loading period, the storage device 100 may decrease and/or prevent occurrence of stalls between meta loadings due to the recovery of the meta data during an open time. Accordingly, the off-time may be improved and/or optimized while minimizing a decrease in performance of the storage device 100.

Figure 2:
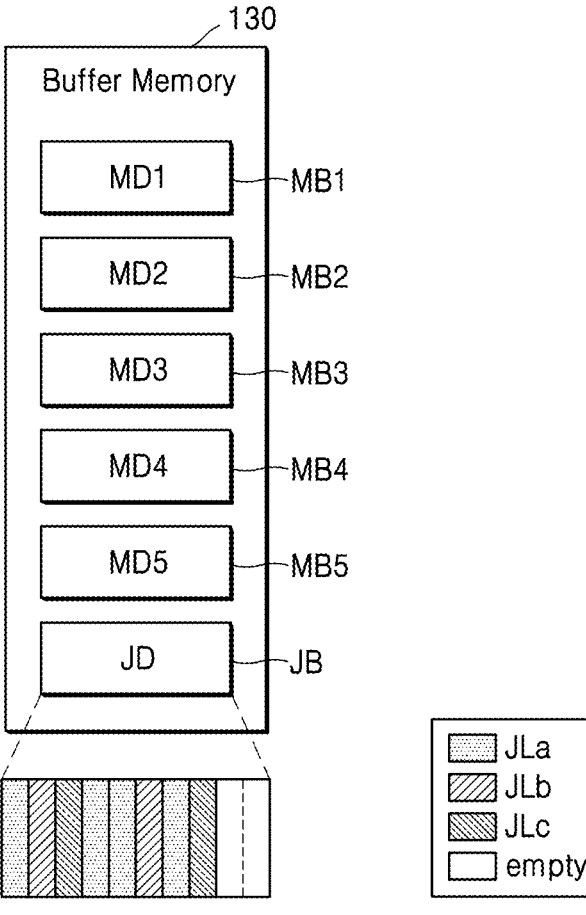
FIG. 2 illustrates a buffer memory according to at least one example embodiment.

FIG. 2 illustrates a buffer memory 130 according to at least one example embodiment.

Referring to FIG. 2, the buffer memory 130 may store a plurality of pieces of meta data, for example, first to fifth meta data blocks MD1 to MD5, but is not limited thereto. For example, the first to fifth meta data blocks MD1 to MD5 may be stored in a plurality of meta buffers, e.g., first to fifth meta buffers MB1 to MB5, respectively, but are not limited thereto. In addition, the buffer memory 130 may store journal data JD corresponding to the first to fifth meta data blocks MD1 to MD5. For example, the journal data JD may be stored in the journal buffer JB. As described above, the buffer memory 130 may include first to fifth meta buffers MB1 to MB5 and a journal buffer JB, but the example embodiments are not limited thereto.

The journal data JD may include a plurality of journals, and the plurality of journals may be divided into a plurality of journal log types (e.g., journal entry types), e.g., first to third types of journal logs JLa, JLb, and JLc according to and/or based on an input/output pattern, but the example embodiments are not limited thereto, and for example, there may be a greater or lesser number of journal log types, etc. For example, the first type of journal log JLa may be generated when meta data is changed according to and/or based on a write command received from the host 10, etc. For example, the second type of journal log JLb may be generated when meta data is changed according to and/or based on a read command received from the host 200. For example, the third type of journal log JLc may be generated when meta data is changed according to and/or based on a trim command received from the host 100. However, the example embodiments are not limited thereto, and the first to third types of journal logs JLa, JLb, and JLc may be classified according to various criteria, and there may be more than four types of journal logs included in the journal data JD, etc.

Journal times of the first to third types of journal logs JLa, JLb, and JLc may be different from each other. For example, the journal time of the first type of the journal log JLa may be 1 μs (microsecond), the journal time of the second type of the journal log JLb may be 2 μs, and/or the journal time of the third type of the journal log JLc may be 4 μs, but the example embodiments are not limited thereto.

When the recovery time corresponding to the journal data JD calculated based on the journal times of the journal logs stored in the journal buffer JB is greater than or equal to the threshold value, the journal data JD may be written to the non-volatile memory 120 together with one of the first to fifth meta data blocks MD1 to MD5. In other words, the journal buffer JB may be flushed within the allotted time period, and thus, the journal buffer JB is changed to an empty state, and new journal logs may be stored in the journal buffer JB.

When new journal logs are stored in the journal buffer JB and the recovery time corresponding to the journal data JD including the new journal logs is greater than or equal to the threshold value, the journal data JD may be written to the non-volatile memory 120 together with the others of the plurality of meta data blocks MD1 to MD5. As described above, the sequentially generated journal data may be sequentially written to the non-volatile memory 120, but is not limited thereto.

Figure 3:
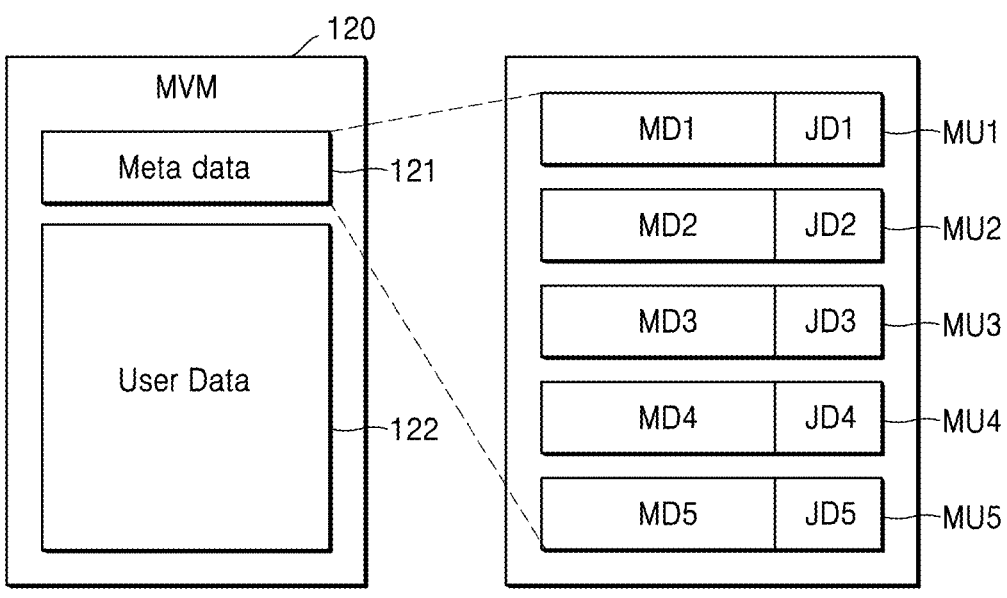
FIG. 3 illustrates a non-volatile memory according to at least one example embodiment.

FIG. 3 illustrates a non-volatile memory 120 according to at least one example embodiment.

Referring to FIG. 3, the non-volatile memory 120 may include a meta data area 121 and/or a user data area 122, etc., but is not limited thereto. Meta data and journal data may be stored in the meta data area 121, and user data requested to be written from the host (e.g., host device 100 in FIG. 1) may be stored in the user data area 122, but the example embodiments are not limited thereto. The meta data area 121 may include the plurality of memory units, e.g., MU1 to MU5, etc. As a non-limiting example, the memory unit may correspond to a page of the non-volatile memory 120, but is not limited thereto.

A plurality of meta data blocks, for example, first to fifth meta data blocks MD1 to MD5, may be stored in first to fifth memory units MU1 to MU5 together with first to fifth journal data JD, but the example embodiments are not limited thereto. Here, each of the first to fifth journal data JD1 to JD5 represents journal data written together with one of the first to fifth meta data blocks MD1 to MD5 when meta writing is performed. In other words, the first to fifth journal data JD1 to JD5 represent the journal data JD stored in the journal buffer (e.g., JB in FIG. 1) at different times when meta writing is performed. For example, the first journal data JD1 stored in the journal buffer (e.g., JB in FIG. 2) at a first point in time may be stored in the first memory unit together with the first journal data (e.g., first meta data block MD1), and the second journal data JD2 stored in the journal buffer JB at a second point in time may be stored in the second memory unit MU22 together with the second journal data block MD2, but the example embodiments are not limited thereto.

Figure 4:
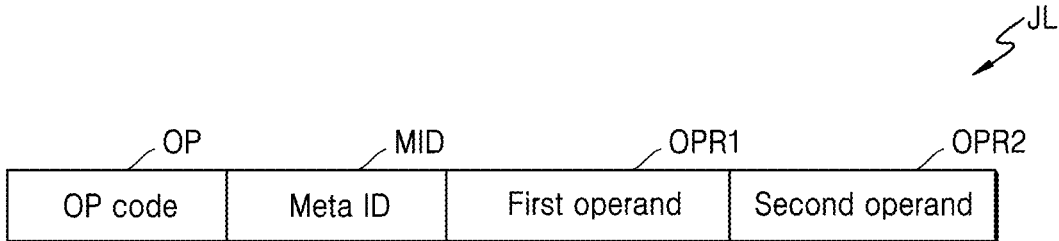
FIG. 4 illustrates a format of a journal log according to at least one example embodiment.

FIG. 4 illustrates a format of a journal log according to at least one example embodiment.

Referring to FIG. 4, the journal log JL may include an operation OP code OP, a meta identifier MID, a first operand OPR1, and/or a second operand OPR2, etc.

The OP code OP may represent operations performed on the storage device (e.g., storage device 100 in FIG. 1) according to and/or based on a request from the host (e.g., host device 200 in FIG. 1), for example, storage, bit set, bit clear, trim, etc., but the example embodiments are not limited thereto. The meta identifier MID indicates which meta data the journal log JL is for. For example, one of the first operand OPR1 and the second operand OPR2 may indicate the length of the meta data, but are not limited thereto.

Figure 5A:
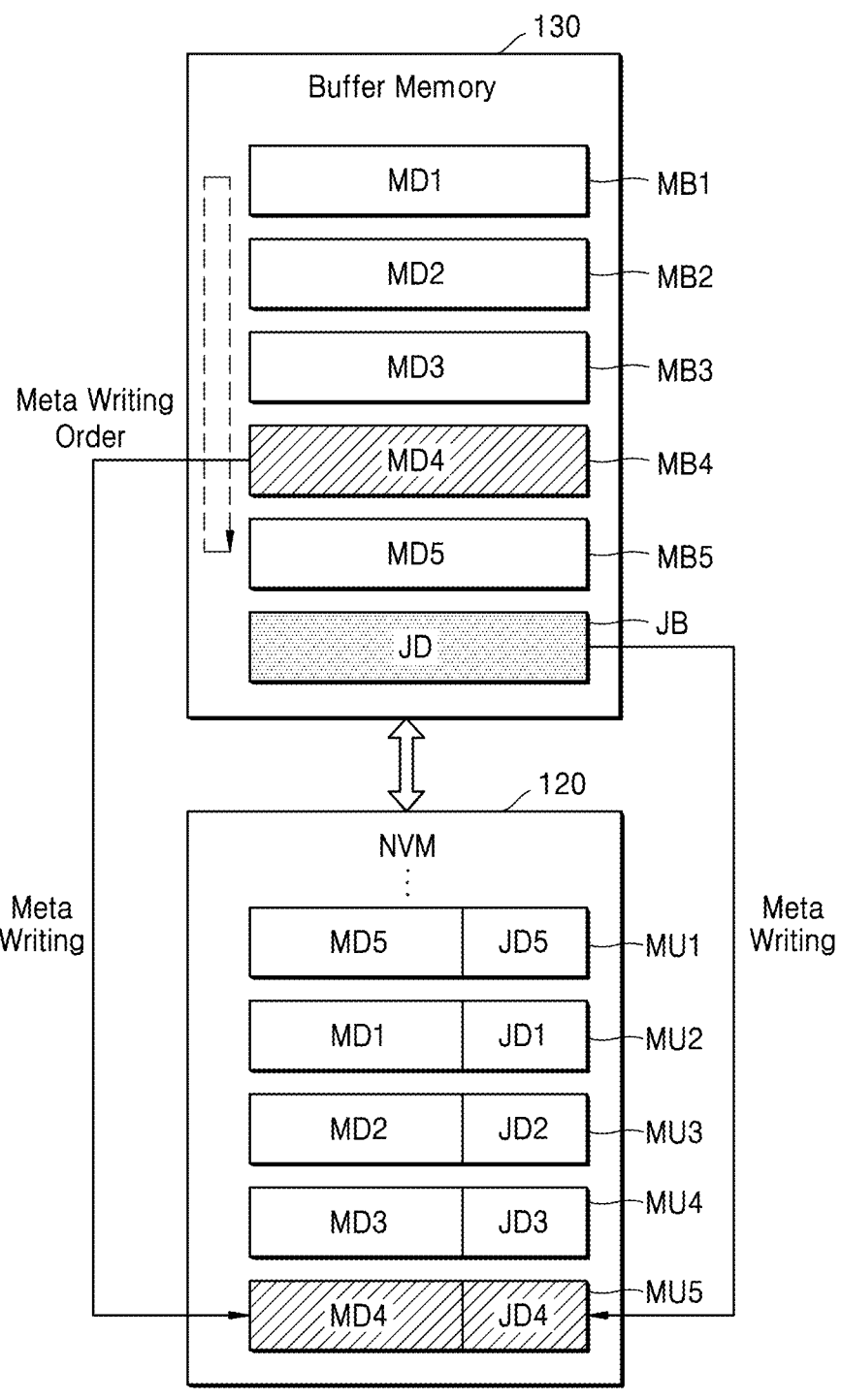
FIGS. 5A and 5B illustrate meta writing according to at least one example embodiment.
Figure 5B:
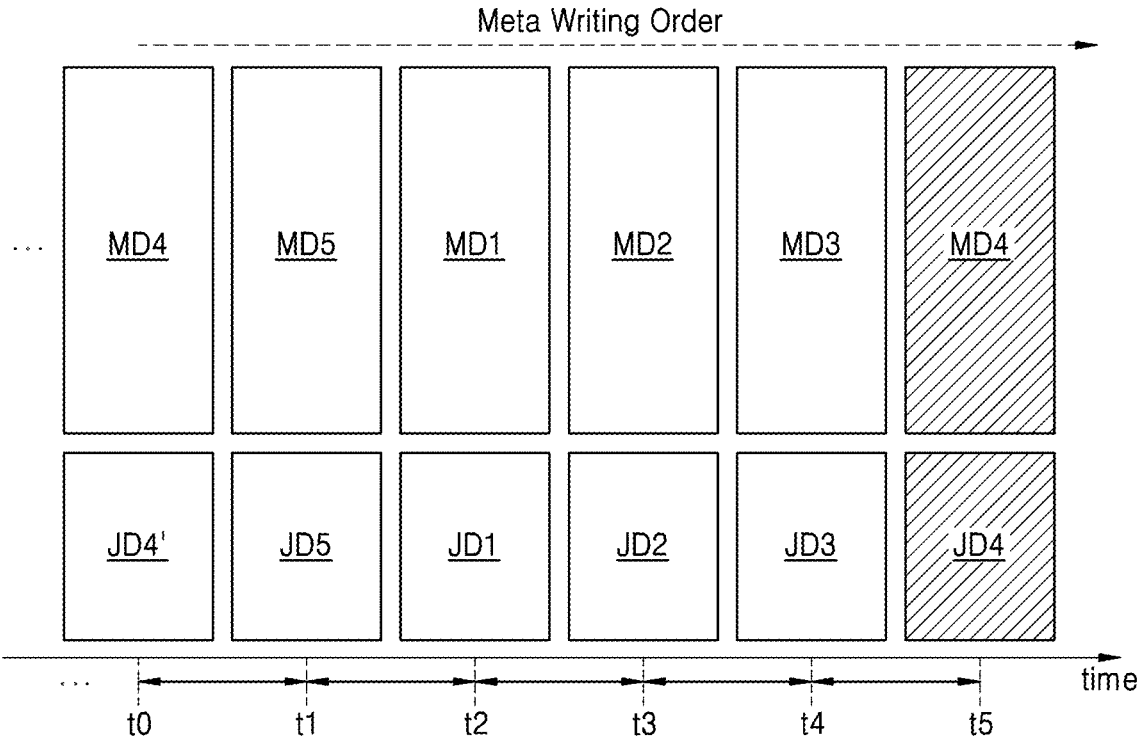

FIGS. 5A and 5B illustrate meta writing according to at least one example embodiment. FIG. 5A illustrates a meta writing method, and FIG. 5B illustrates the order of meta writing. Meta writing will be described with reference to FIG. 1 together, but the example embodiments are not limited thereto.

Referring to FIG. 5A, a plurality of meta data blocks, e.g., first to fifth meta data blocks MD1 to MD5, etc., are stored in a plurality of meta buffers, e.g., the first to fifth meta buffers MB1 to MB5, etc., of the buffer memory 130, respectively, and journal data JD is stored in the journal buffer JB. As described with reference to FIG. 2, the journal data JD may include a plurality of journal logs, but is not limited thereto.

When the recovery time corresponding to the journal data JD is greater than or equal to the threshold value as the meta data of each of the first to fifth meta data blocks MD1 to MD5 is updated and journal logs are stored in the journal buffer JB, the memory controller 110 may perform meta writing, but the example embodiments are not limited thereto.

The memory controller 110 may store one of the first to fifth meta data blocks MD1 to MD5 and the journal data JD in the non-volatile memory 120. For example, the memory controller 110 may write the fourth meta data block MB4 and the journal data JD to the fifth memory unit MU5, but is not limited thereto. Here, the journal data JD stored in the fifth memory unit MU5 together with the fourth meta data block MB4 is represented as the fourth journal data JD4.

The journal buffer JB is flushed (e.g., the data stored in the journal buffer JB is written to the non-volatile memory 120), and the journal buffer JB becomes empty. Thereafter, meta data of the first to fifth meta data blocks MD1 to MD5 may be updated, and new journal logs may be stored in the journal buffer JB, etc.

As meta writing is performed, the first to fifth meta data blocks MD1 to MD5 may be written and/or sequentially written to the non-volatile memory 120 together with the journal data JD. Since meta data of the first to fifth meta data blocks MD1 to MD5 may be updated and/or continuously updated during the run-time of the storage device 100, the first to fifth meta data blocks MD1 to MD5 may be written (e.g., continuously and/or sequentially written, etc.) to the non-volatile memory 120, but the example embodiments are not limited thereto.

Referring to FIG. 5B, the first to fifth meta data blocks MD1 to MD5 are written and/or sequentially written (e.g., meta-written) to the non-volatile memory 120, the fourth meta data block MD4 and the previous fourth journal data JD4' stored in the journal buffer JB are meta-written at the timepoint t0, and the fifth meta data block MD5 and the fifth journal data JD5 stored in the journal buffer JB may be meta-written at the timepoint t1, etc. Here, the fifth journal data JD5 is the journal data JD stored in the journal buffer JB from the timepoint t0 and includes journal logs stored in the journal buffer JB from the timepoint to t0 the timepoint t1, etc.

Thereafter, at the timepoint t2, the first meta data block MD1 may be meta-written again together with the first journal data JD1 stored in the journal buffer JB from the timepoint t1. At the timepoint t3, the second meta data block MD2 and the second journal data JD2 stored in the journal buffer JB from the timepoint t2 are meta-written. At the timepoint t4, the third meta data block MD3 and the third journal data JD3 stored in the journal buffer JB from the timepoint t3 are meta-written. At the timepoint t5, the fourth meta data block MD4 and the fourth journal data JD4 stored in the journal buffer JB from the timepoint t4 are meta-written.

In this way, the first to fifth meta data blocks MD1 to MD5 stored in the buffer memory 130 may be written (and/or continuously and/or sequentially written) to the non-volatile memory 120 together with the journal data, but the example embodiments are not limited thereto.

Figure 6A:
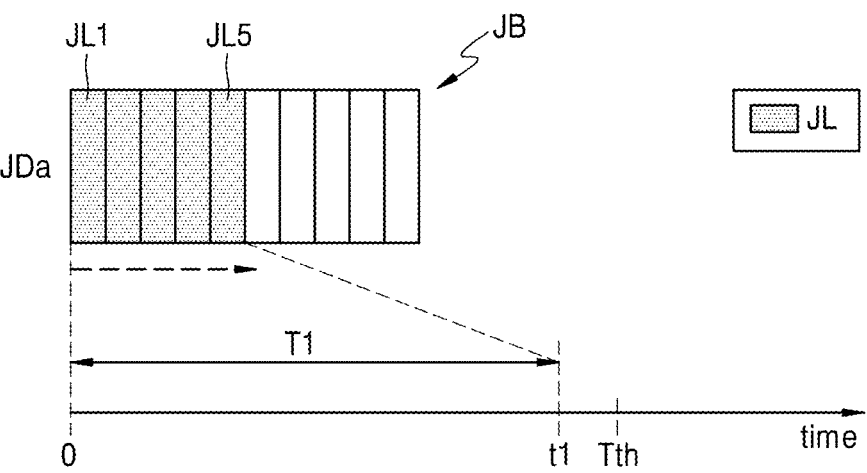
FIGS. 6A and 6B are diagrams for explaining a method of determining whether to perform meta writing, according to at least one example embodiment.
Figure 6B:
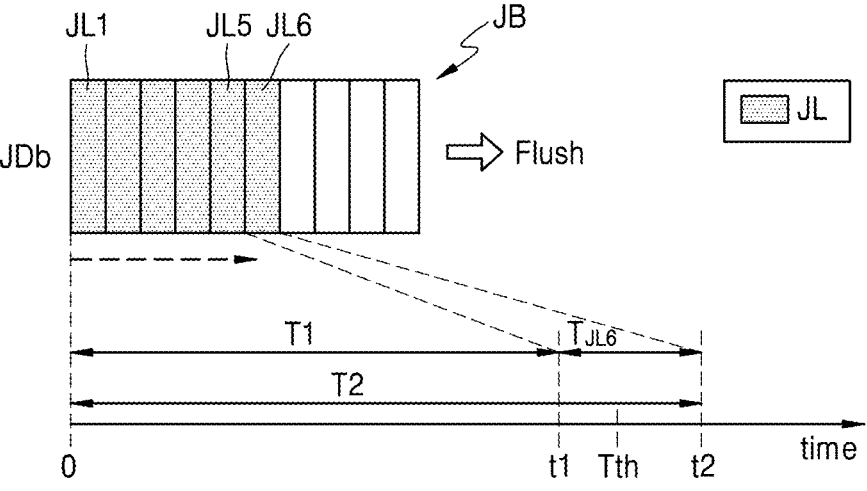

FIGS. 6A and 6B are diagrams for explaining a method of determining whether to perform meta writing, according to at least one example embodiment. FIG. 6A shows the journal data JDa and the recovery time corresponding to the journal data JDa at the timepoint t1, and FIG. 6B shows the journal data JDb and the recovery time corresponding to the journal data JDb at the timepoint t2, but the example embodiments are not limited thereto.

As shown in FIG. 6A, journal logs are stored in the journal buffer JB, and a plurality of journal logs, e.g., first to fifth journal logs JL1 to JL5, etc., may be stored at the timepoint t1. The recovery time corresponding to the journal data JDa including the first to fifth journal logs JL1 to JL5 may be T1.

The journal management module (e.g., journal management module 12 in FIG. 1) may compare T1, which is the recovery time corresponding to the journal data JDa, with a threshold value, such as a threshold time Tth. The threshold time Tth may be set in advance and may be set to a meta loading time (for example, $T_{ML}$ of FIG. 9B) or less, but the example embodiments are not limited thereto. T1 is less than the threshold time Tth. The journal management module 12 may determine that meta writing is not desired and/or necessary.

Thereafter, as illustrated in FIG. 6B, the sixth journal log JL6 is additionally stored in the journal buffer JB, and a sixth journal time $T_{JL6}$, which is expected to be desired and/or required for replay of the sixth journal log JL6, may be added to the recovery time of T1. Accordingly, the recovery time corresponding to the journal data JDb including the first to sixth journal logs JL1 to JL6 may be T2.

The journal management module 12 may compare T2, which is the recovery time corresponding to the journal data JDb, with a threshold value, such as the threshold time Tth, but the example embodiments are not limited thereto. T2 is greater than the threshold time Tth. The journal management module 12 may determine that meta writing is desired and/or necessary. The memory controller 110 may perform meta writing, and the journal buffer JB may be flushed.

As described above, the memory controller 110 may compare the recovery time corresponding to the journal data with a threshold time and may perform the meta writing when the recovery time thereof is greater than or equal to the threshold time.

Figure 7A:
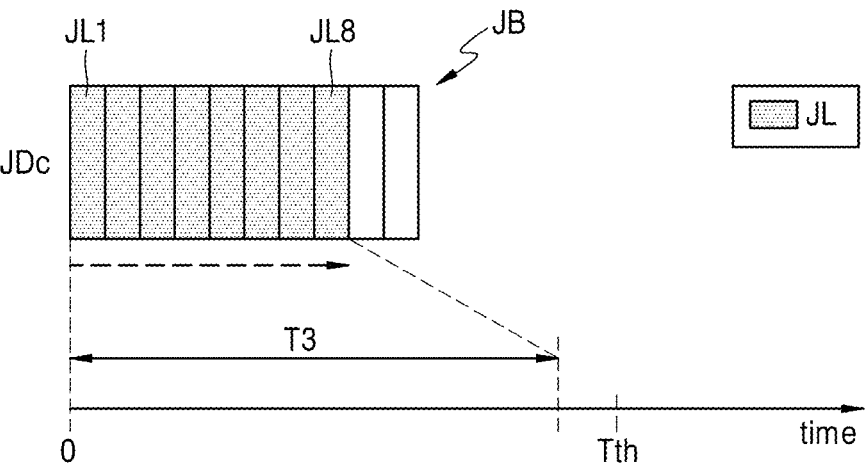
FIGS. 7A and 7B are diagrams for explaining a method of determining whether to perform meta writing, according to at least one example embodiment.
Figure 7B:
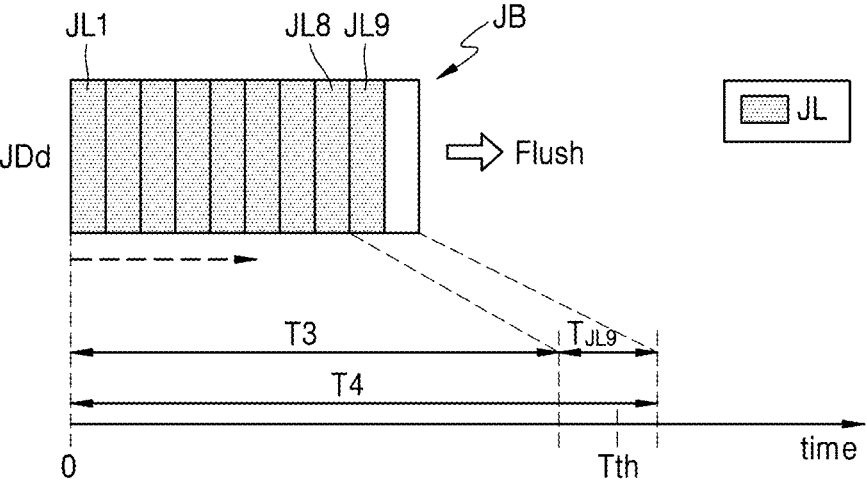

FIGS. 7A and 7B are diagrams for explaining a method of determining whether to perform meta writing, according to at least one example embodiment. FIG. 7A shows the journal data JDc and the recovery time corresponding to the journal data JDc at the timepoint t3, and FIG. 7B shows the journal data JDd and the recovery time corresponding to the journal data JDd at the timepoint t3, but the example embodiments are not limited thereto.

As shown in FIG. 7A, journal logs are stored in the journal buffer JB, and a plurality of journal logs, e.g., first to eighth journal logs JL1 to JL8, etc., may be stored at the timepoint t3. The recovery time corresponding to the journal data JDc including the first to eighth journal logs JL1 to JL8 may be T3, but is not limited thereto.

The journal management module (e.g., journal management module 12 in FIG. 1) may compare T3, which is the recovery time corresponding to the journal data JDc, with a threshold value, such as the threshold time Tth, but the example embodiments are not limited thereto. T3 is less than the threshold time Tth. The journal management module 12 may determine that meta writing is not desired and/or necessary.

Meanwhile, in FIG. 6B, the recovery time corresponding to the journal data JDb including the first journal log JL1 to the sixth journal log JL6 is T2, and in FIG. 7B, the recovery time corresponding to the journal data JDb including the first journal log JL1 to the eighth journal log JL8 is T3, which is shorter than T2, etc. As described above with reference to FIG. 2, the journal time of the journal log may vary depending on the type of the journal log, and accordingly, even if the journal data JDb includes eight journal logs and the journal data JDc of FIG. 6B includes six journal logs, T3, which is the journal time of the journal data JDc, may be shorter than T2, which is the journal time of the journal data JDb, but the example embodiments are not limited thereto.

Subsequently, as illustrated in FIG. 7B, an additional ninth journal log JL9 is stored in the journal buffer JB, and the ninth journal time $T_{JL9}$, which is expected to be taken to replay the ninth journal log JL9, may be added to the recovery time T3. Accordingly, the recovery time corresponding to the journal data JDd including the first to ninth journal logs JL1 to JL9 may be T4.

The journal management module 12 may compare T4, which is the recovery time corresponding to the journal data JDd, with a threshold value, such as the threshold time Tth. T4 is greater than the threshold time Tth. Thus, the journal management module 12 may determine that meta writing is desired and/or necessary. The memory controller 110 may perform meta writing, and the journal buffer JB may be flushed.

Figure 8:
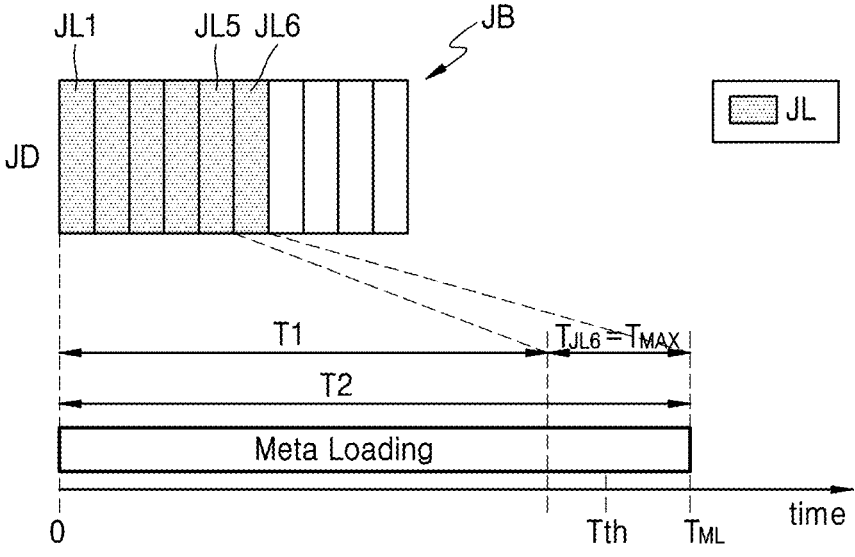
FIG. 8 illustrates a method of setting a threshold time, according to at least one example embodiment.

FIG. 8 illustrates a method of setting a threshold time, according to at least one example embodiment.

Referring to FIG. 8, the threshold time Tth is set based on the meta loading time $T_{ML}$, and may be set to be less than the meta loading time $T_{ML}$. When the plurality of journal logs, e.g., first to fifth journal logs JL1 to JL5, etc., are stored in the journal buffer JB, the recovery time corresponding to the journal data JD may be T1 and T1 may be shorter than the threshold time Tth, but the example embodiments are not limited thereto. Thereafter, when the sixth journal log JL6 is additionally stored in the journal buffer JB, the sixth journal time $T_{JL6}$ corresponding to the sixth journal log JL6 is added to the recovery time T2. In other words, the recovery time is updated based on the sixth journal time $T_{JL6}$. The updated recovery time T2 may be greater than or equal to the threshold time Tth, and accordingly, journal writing may be performed.

Here, the threshold time Tth may be set so that the recovery time T2 does not exceed the meta loading time $T_{ML}$. Even if the journal time (e.g., the sixth journal time $T_{JL6}$ of the sixth journal log JL6) of the journal log added to the journal buffer JB immediately before the meta writing is performed is the longest, the maximum journal time $T_{MAX}$ of the journal times of the journal logs, the recovery time should not exceed the meta loading time $T_{ML}$. Accordingly, the threshold time Tth may be set shorter than the meta loading time $T_{ML}$ by at least the maximum journal time $T_{MAX}$.

Figure 9A:
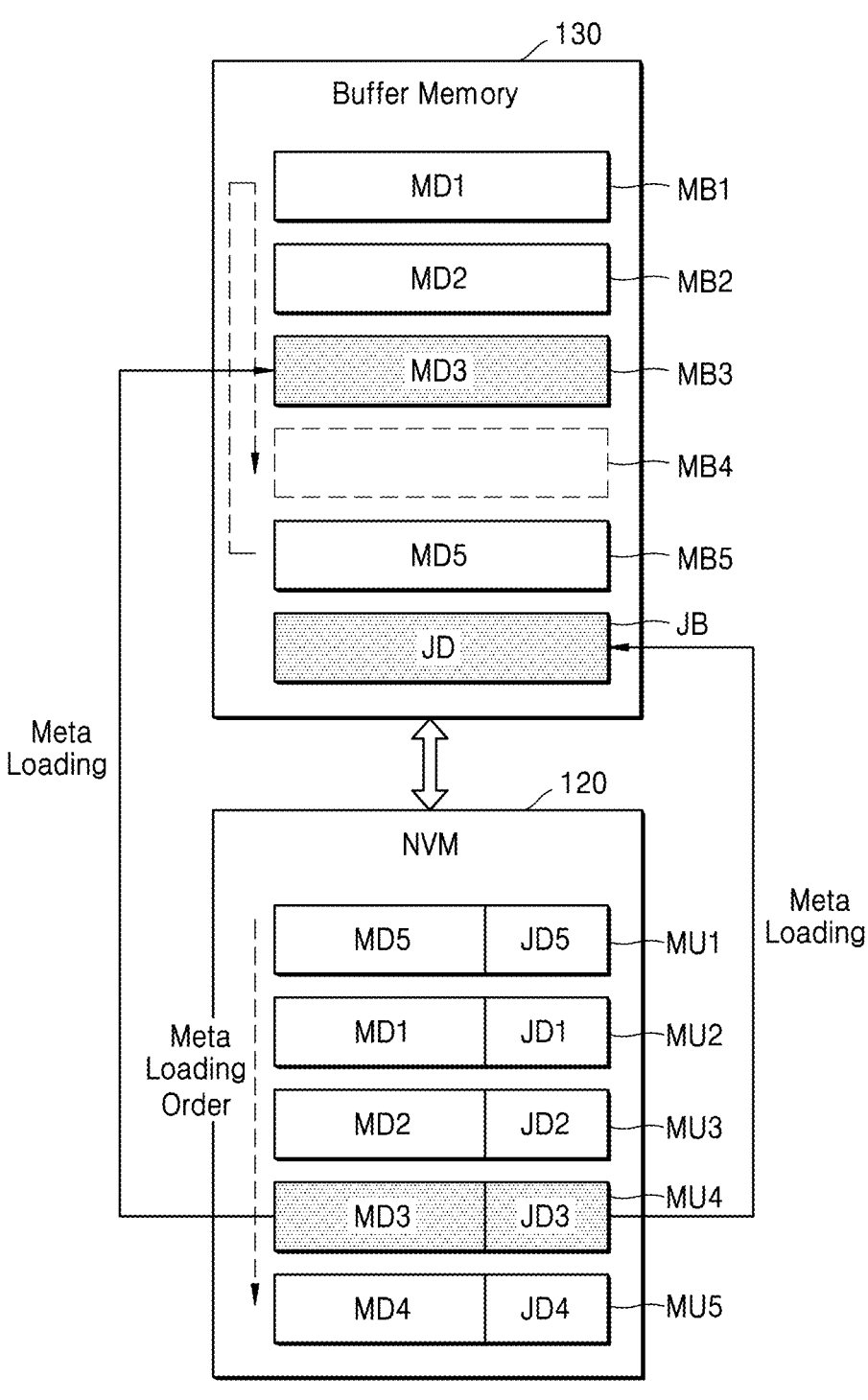
FIGS. 9A and 9B illustrate meta loading according to at least one example embodiment.
Figure 9B:
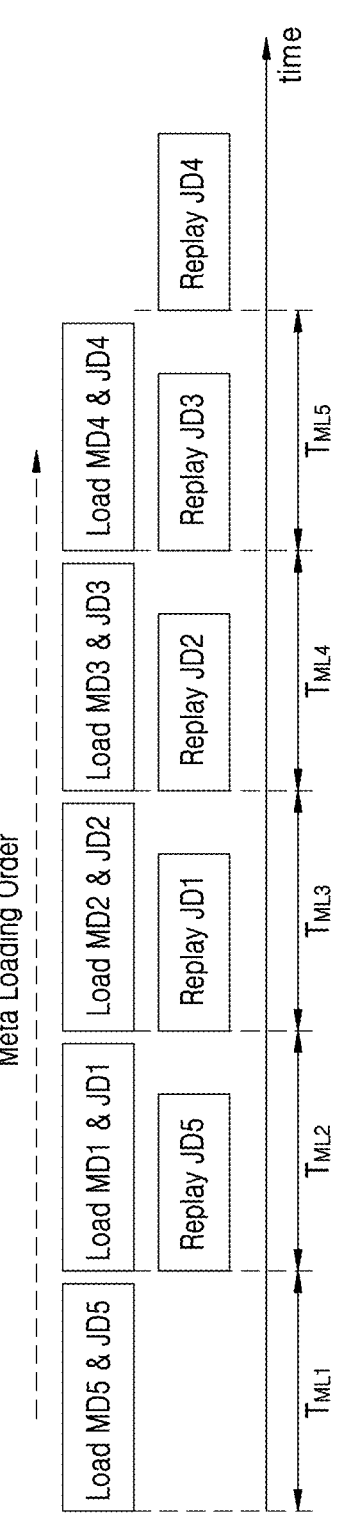

FIGS. 9A and 9B illustrate meta loading according to at least one example embodiment. FIG. 9A illustrates a meta loading method, and FIG. 9B illustrates the order of meta loading. Meta loading will be described with reference to FIG. 1 together.

Referring to FIG. 9A, a plurality of memory units, e.g., the first to fifth memory units MU1 to MU5, etc., of the non-volatile memory 120 store a plurality of meta data blocks, e.g., first to fifth meta data blocks MD1 to MD5, etc., and also store a plurality of journal data, e.g., first to fifth journal data JD1 to JD5, etc., respectively.

For example, the fifth meta data block MD5 stored in the first memory unit MU1 may be the first meta data block written from among the first to fifth meta data MD1 to MD5, and the fifth journal data JD5 may be the first journal data written from among the first to fifth journal data JD1 to JD5. The fourth meta data block MD4 stored in the fifth memory unit MU5 may be the last meta data block written from among the first to fifth meta data MD1 to MD5, and the fourth journal data JD4 may be the last journal data written from among the first to fifth journal data JD1 to JD5. The fourth meta data block MD4 and the fourth journal data JD4 may be the data block and journal data last meta-written into the non-volatile memory 120 by the power-off operation when the storage device (e.g., storage device 100 in FIG. 1) is powered-off, but the example embodiments are not limited thereto.

Referring to FIG. 5B, the fifth meta data block MD5 includes meta data updated up to the timepoint t0, and the fifth journal data JD5 includes changes in meta data (e.g., changes in meta data of each of the first to fifth meta data blocks MD1 to MD5) from the timepoint to t0 the timepoint t1. In other words, the fifth journal data JD5 includes journal logs generated from the timepoint t0 to the timepoint t1. The first meta data block MD1 includes meta data updated up to the timepoint t1, and the first journal data JD1 includes changes in meta data from the timepoint t1 to the timepoint t2. The second meta data block MD2 includes meta data updated to the timepoint t2, and the second journal data JD2 includes changes in meta data from the timepoint t2 to the timepoint t3. The third meta data block MD3 includes meta data updated to the timepoint t3, and the third journal data JD3 includes changes in meta data from the timepoint t3 to the timepoint t4. The fourth meta data block MD4 includes meta data updated to the timepoint t4, and the fourth journal data JD4 includes changes in meta data from the timepoint t4 to the timepoint t5.

After the storage device 100 is powered on, the first to fifth meta data MD1 to MD5 and the first to fifth journal data JD1 to JD5 may be loaded into the buffer memory 130 during an open time (e.g., during a time when another memory operation is not scheduled and/or performed, etc.). One piece of meta data and journal data corresponding thereto may be loaded in the buffer memory 130, which may be referred to as meta loading. From the fifth meta data block MD5 and the fifth journal data JD5 written first in the non-volatile memory 120 to the fourth meta data block MD4 and the fourth journal data JD4 written last in the non-volatile memory 120 may be loaded and/or loaded sequentially into the buffer memory 130, etc.

Referring to FIG. 9B together, meta loading may be performed during first to fifth meta loading periods $T_{ML1}$ to $T_{ML5}$, but is not limited thereto. The time of each of the first to fifth meta loading periods $T_{ML1}$ to $T_{ML5}$, that is, the meta loading time, may be the same, but are not limited thereto.

During the first meta loading period $T_{ML1}$, the fifth meta data block MD5 and the fifth journal data JD5 may be loaded into the fifth meta buffer MB5 and the journal buffer JB of the buffer memory 130.

Thereafter, the first meta data block MD1 and the first journal data JD1 may be loaded into the first meta buffer MB1 and the journal buffer JB of the buffer memory 130 during the second meta loading period $T_{ML2}$. In this case, journal logs included in the fifth journal data MD5 may be replayed (e.g., reviewed, analyzed, etc.), and accordingly, the fifth meta data block MD5 may be recovered based on the fifth journal data JD5. The fifth meta data block MD5 may include changes up to the timepoint t1.

During the third meta loading period $T_{ML3}$, the second meta data block MD2 and the second journal data JD2 may be loaded into the second meta buffer MB2 and the journal buffer JB of the buffer memory 130. In this case, journal logs included in the first journal data JD1 may be replayed, and accordingly, the fifth meta data block MD5 and the first meta data block MD1 may be recovered based on the first journal data JD1, etc. The fifth meta data block MD5 and the first meta data block MD1 may include changes up to the timepoint t2.

During the fourth meta loading period $T_{ML4}$, the third meta data block MD3 and the third journal data JD3 may be loaded into the third meta buffer MB3 and the journal buffer JB of the buffer memory 130. In this case, journal logs included in the second journal data JD2 may be replayed, and accordingly, the fifth meta data block MD5, the first meta data block MD1, and the second meta data block MD2 may be recovered based on the second journal data JD2, etc. The fifth meta data block MD5, the first meta data block MD1, and the second meta data block MD2 may include changes up to the timepoint t3.

During the fifth meta loading period $T_{ML5}$, the fourth meta data block MD4 and the fourth journal data JD4 may be loaded into the fourth meta buffer MB4 and the journal buffer JB of the buffer memory 130. Thus, meta loading may be completed. Journal logs included in the third journal data JD3 may be replayed during the fifth meta loading period $T_{ML5}$, and accordingly, the fifth meta data block MD5, the first meta data block MD1, the second meta data block MD2, and the third meta data block MD3 may be recovered based on the third journal data JD3, etc. The fifth meta data block MD5, the first meta data block MD1, the second meta data block MD2, and the third meta data block MD3 may include changes up to the timepoint t4.

Thereafter, journal logs included in the fourth journal data JD4 may be replayed, and accordingly, the first to fifth meta data blocks MD1 to MD5 may be recovered based on the third journal data JD3. Accordingly, all update results of the first to fifth meta data blocks MD1 to MD5 may be recovered before the storage device 100 is powered off (e.g., due to a sudden power off event, etc.).

In this way, the memory controller 110 may perform meta loading and meta data recovery operations based on journal data according to and/or based on a pipeline method, and since the recovery time corresponding to each of the first to fourth journal data JD1 to JD4 does not exceed the meta loading time, there is no occurrence and/or decreased occurrence of stalls happening between meta loadings.

Figure 10:
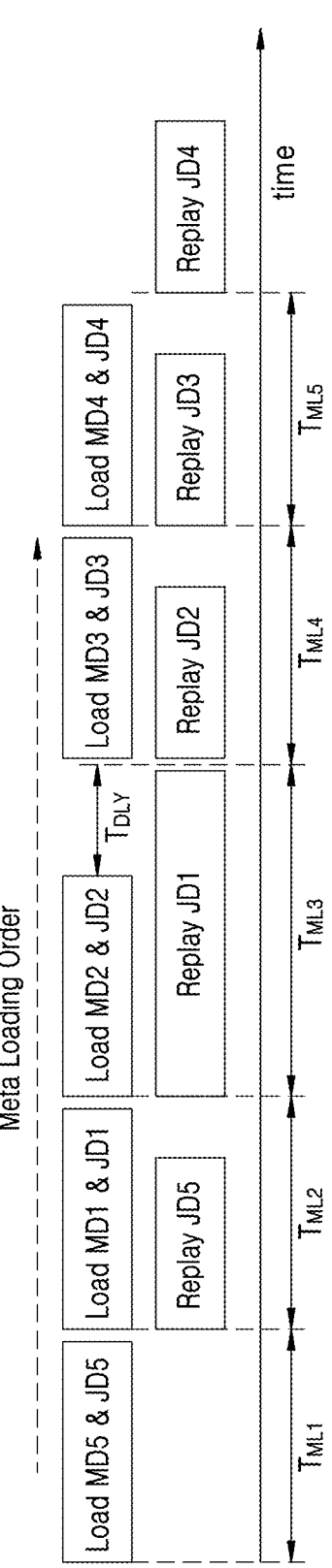
FIG. 10 illustrates meta loading according to a comparative example.

FIG. 10 illustrates meta loading according to a comparative example.

The meta loading in FIG. 10 represents meta loading when meta writing is performed if meta writing is not determined based on the recovery time corresponding to journal data according to at least one example embodiment of the inventive concepts and the journal buffer (e.g., journal buffer JB in FIG. 2) is full. Meta writing was not performed based on the recovery time corresponding to journal data, and accordingly, the recovery time corresponding to journal data may exceed the meta loading period.

Referring to FIG. 10, the second meta data block MD2 and the second journal data JD2 may be loaded into the buffer memory 130 during the third meta data loading period $T_{ML3}$, in which the first journal data JD1 loaded into the buffer memory 130 during the second meta data loading period $T_{ML2}$, may be replayed to recover the fifth meta data block MD5 and the first meta data block MD1. The recovery time corresponding to the first journal data JD1 may be longer than the time for meta loading the second meta data block MD2 and the journal data JD2. Accordingly, the third meta loading period $T_{ML3}$ may be longer than other meta loading periods, and after the second meta loading block MD2 and the second journal data JD2 have been meta-loaded, the next meta loading, for example meta loading of the third meta data block MD3 and the third journal data JD3, may be delayed by $T_{DLY}$.

The storage device (e.g., storage device 100 of FIG. 1) according to at least one example embodiment of the inventive concepts determines the meta writing performance so that the recovery time corresponding to the journal data does not exceed the meta loading time, thereby decreasing and/or preventing occurrence of stall between meta loadings.

Figure 11A:
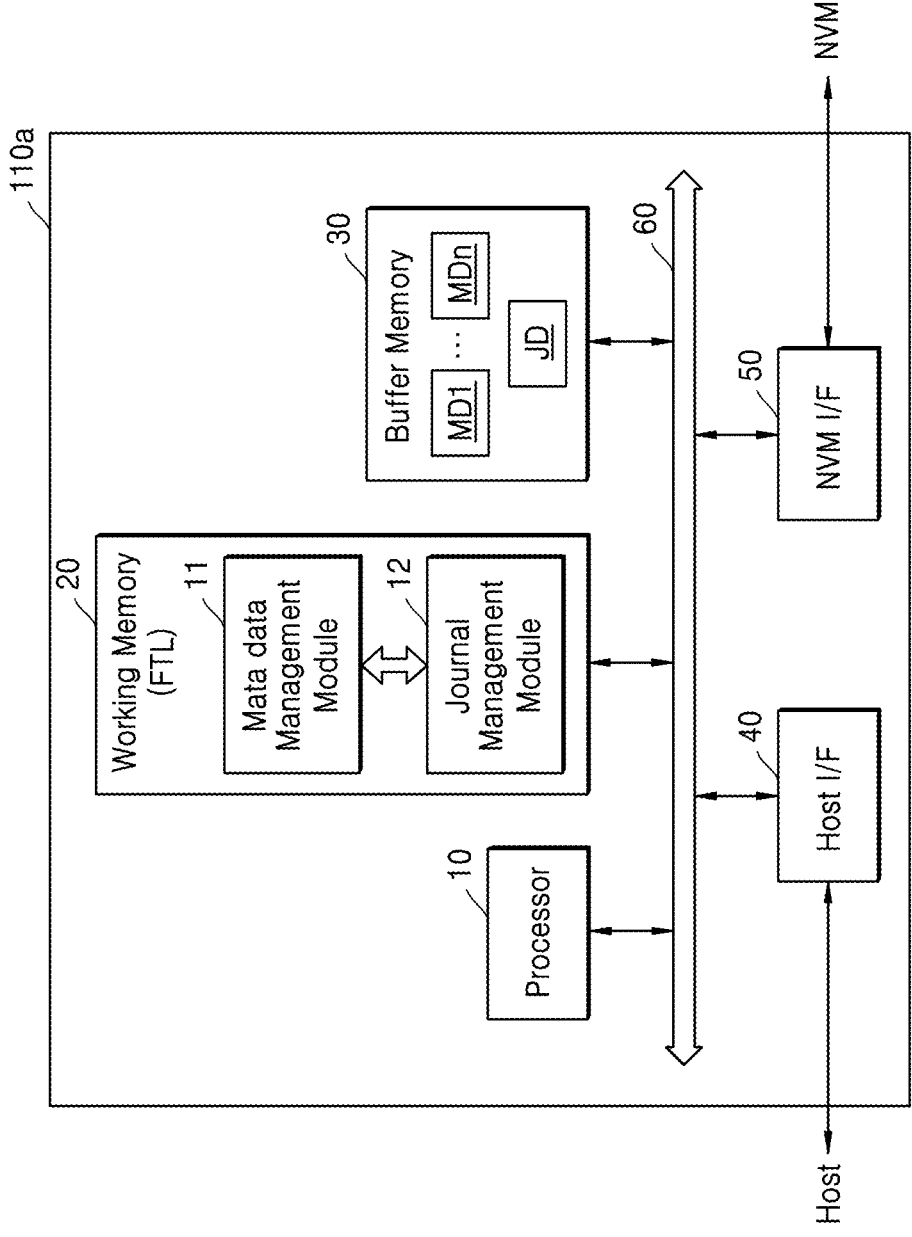
FIGS. 11A and 11B are block diagrams illustrating memory controllers according to some example embodiments, respectively.
Figure 11B:
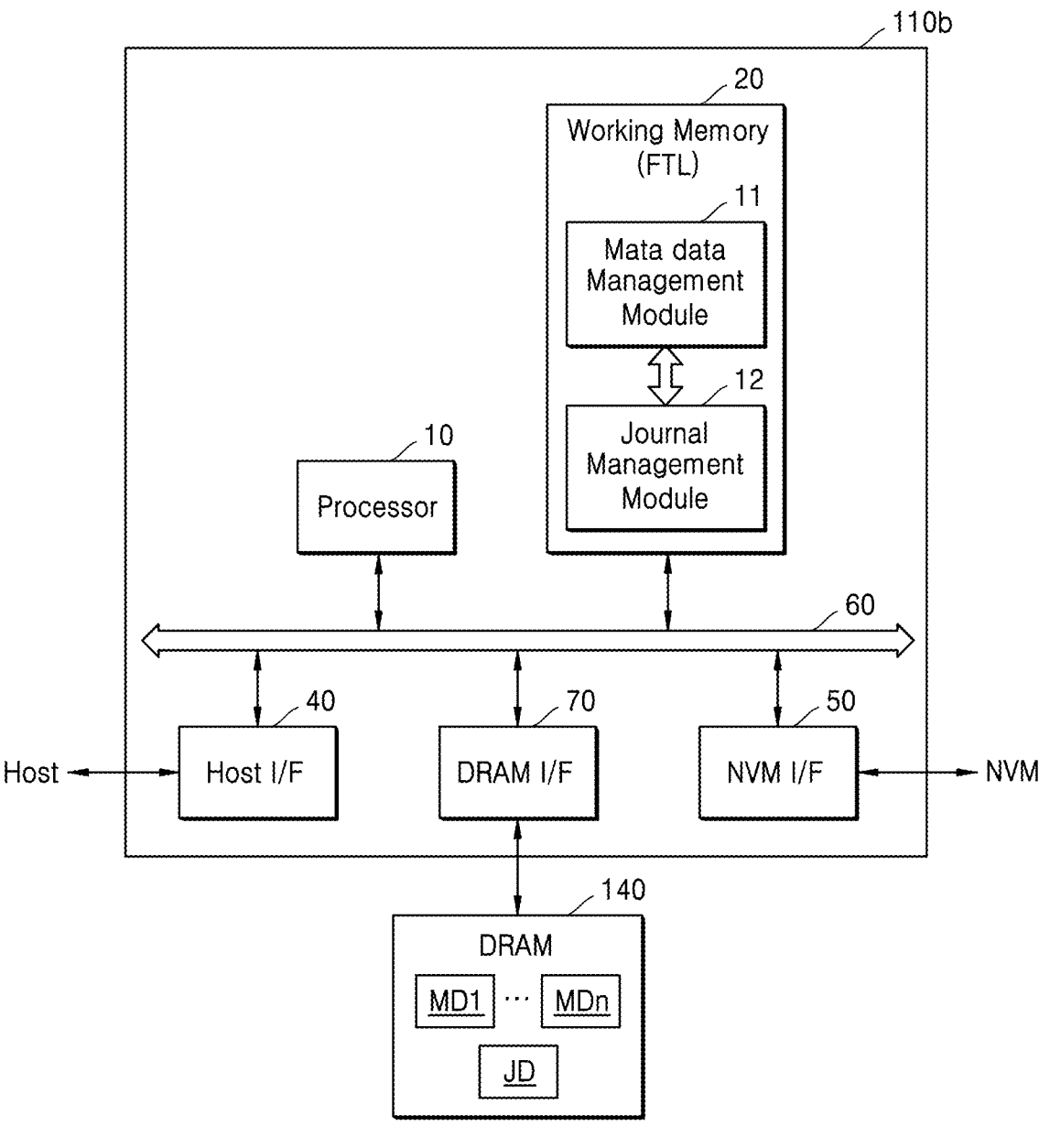

FIGS. 11A and 11B are block diagrams illustrating memory controllers 110a and 110b according to some example embodiments, respectively.

Referring to FIG. 11A, the memory controller 110a may include at least one processor 10, a working memory 20, a buffer memory 30, a host interface (Host I/F) 40, and/or a non-volatile memory interface (NVM I/F) 50, which may communicate with each other through at least one bus 60, but the example embodiments are not limited thereto. According to some example embodiments, the memory controller 110a, the at least one processor 10, the working memory 20, the buffer memory 30, the Host I/F 40, the NVM I/F 50, and/or the at least one bus 60, etc., may be implemented as processing circuitry. The processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The processor 10 may include a CPU, a microprocessor, or the like, and may control the overall operation of the memory controller 110a, etc. In at least one example embodiment, the processor 10 may be implemented as a multi-core processor, for example, a dual-core processor or a quad-core processor, etc., but is not limited thereto.

In at least one example embodiment, the memory controller 110a may include: a plurality of flash cores (F-cores) corresponding to the number of non-volatile memory chips electrically connected to the memory controller 110a and/or the number of channels between the memory controller 110a and the non-volatile memory (e.g., non-volatile memory 120 of FIG. 1); and a central core that manages the plurality of flash cores. Here, the plurality of flash cores may execute a plurality of journal management modules, respectively, and the plurality of journal management modules may manage a plurality of journal log sets, respectively.

The meta data management module 11 and the journal management module 12 may be loaded into the working memory 20, and the meta data management module 11 and the journal management module 12 may be implemented in firmware and/or software executed by hardware or hardware, and may be loaded into the working memory 20. However, the example embodiments are not limited thereto, and in some example embodiments, the journal management module 12 may be placed outside (e.g., external to) the working memory 20. The working memory 20 may store a flash translation layer FTL that may be executed by the processor 10.

The buffer memory 30 may store first to n-th meta data blocks MD1 to MDn and journal data JD. In at least one example embodiment, the working memory 20 and the buffer memory 30 may be implemented as the same memory chip, but is not limited thereto. In at least one example embodiment, the working memory 20 and the buffer memory 30 may be implemented as individual memory chips, respectively. For example, at least one of the working memory 20 and the buffer memory 30 may be implemented as a volatile memory such as DRAM and/or SRAM, and/or a non-volatile memory such as PRAM and/or flash memory, etc.

The host interface 40 may provide an interface between the host (e.g., host 100 in FIG. 1) and the memory controller 110a and may provide an interface according to, for example, a USB interface, an MMC interface, a PCI-E interface, an ATA interface, a SATA interface, a PATA interface, a Small Computer System Interface (SCSI) interface, SAS, an ESDI interface, an IDE interface, or the like, but the example embodiments are not limited thereto.

The non-volatile memory interface 50 may provide an interface between the memory controller 110a and/or the non-volatile memory 120 of FIG. 1, but is not limited thereto. For example, first to n-th meta data blocks MD1 to MDn, journal log data JD, write data, and/or read data may be transmitted and/or received between the memory controller 110a and the non-volatile memory 120 through the non-volatile memory interface 50, etc. In at least one example embodiment, the number of non-volatile memory interfaces 50 may correspond to the number of non-volatile memory chips included in the storage device (e.g., storage device 10 in FIG. 1) and/or the number of channels between the memory controller 110a and the non-volatile memory 120, etc.

Referring to FIG. 11B, the memory controller 110b may include at least one processor 10, a working memory 20, a host interface 40, a non-volatile memory interface 50, and/or a DRAM interface 70, which may communicate with each other through at least one bus 60. The memory controller 110b in accordance with the at least one example embodiment may correspond to a modified example of the memory controller 110a in FIG. 11A, and thus a redundant description will be omitted.

According to the at least one example embodiment, the buffer memory 130 (see FIG. 1) may be implemented as a DRAM 140 outside (e.g., external to) the memory controller 110b, but is not limited thereto. The buffer memory 30 may store first to n-th meta data blocks MD1 to MDn and journal data JD, etc.

The DRAM interface 70 may provide an interface between the memory controller 110b and the DRAM 140, etc. For example, some data included in the first to n-th meta data blocks MD1 to MDn and journal data JD may be transmitted and/or received between the memory controller 110b and the DRAM 140 through the DRAM interface 70.

Figure 12:
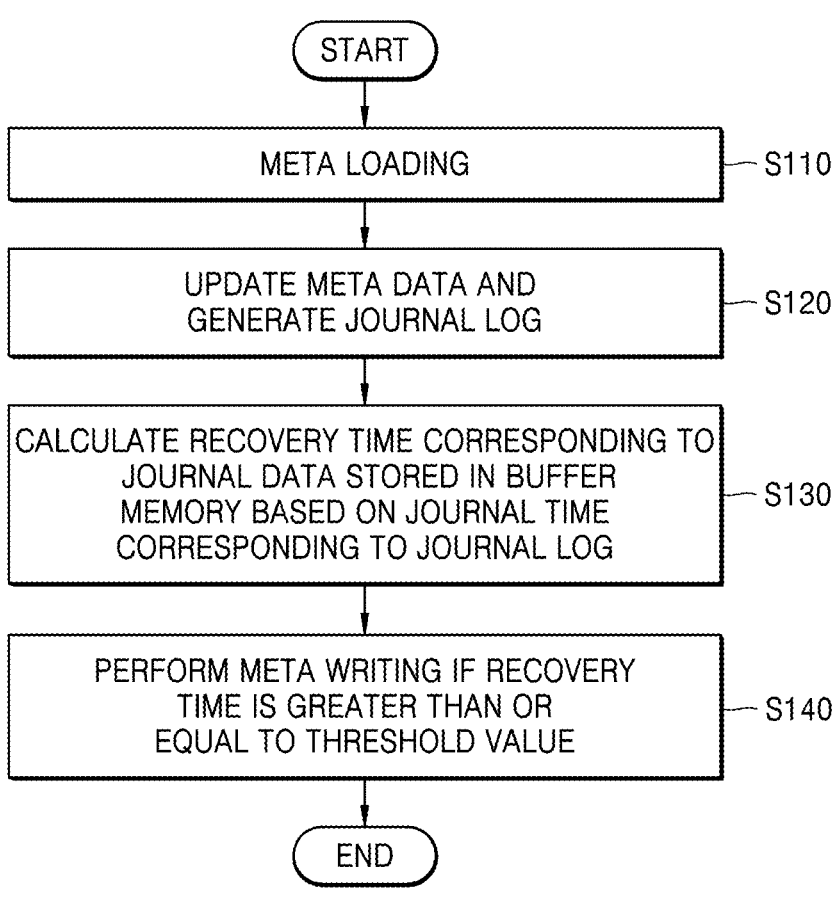
FIG. 12 is a flowchart illustrating an operating method of a memory controller according to at least one example embodiment.

FIG. 12 is a flowchart illustrating an operating method of a memory controller according to at least one example embodiment.

Referring to FIG. 12, the operating method according to the at least one example embodiment may correspond to a method of managing meta data blocks and journal data and performing meta writing during a run-time of a storage device (e.g., storage device 100 in FIG. 1), but the example embodiments are not limited thereto. The operating method according to the at least one example embodiment may include, for example, operations performed in time series by the memory controller 110 of FIG. 1. The description with reference to FIGS. 1 to 11 may be applied to the at least one example embodiment, and redundant descriptions will be omitted.

A memory controller, e.g., the memory controller 110 of FIG. 1, may perform meta loading (S110), but the example embodiments are not limited thereto. The memory controller 110 may load and/or sequentially load a plurality of meta data blocks stored in the non-volatile memory 120 into a buffer memory (e.g., the buffer memory 130 of FIG. 1). The memory controller 110 may load journal data corresponding to each of the plurality of meta data blocks into the buffer memory 130, and when performing meta loading, at least one meta data block already loaded into the buffer memory 130 may be recovered based on the journal data already loaded in the buffer memory 130, as described with reference to FIG. 9B, but the example embodiments are not limited thereto.

The memory controller 110 may update the meta data and generate a journal log indicating update information of the meta data (S120). The journal log may be stored in a journal buffer, e.g., journal buffer JB of FIG. 2, of the buffer memory 130. The memory controller 110 may perform operations, such as writing and/or reading, etc., based on commands from the host (e.g., host 200 in FIG. 1), update meta data that changes according to and/or based on the operations, and generate a journal log in response to the update of the meta data.

The memory controller 110 may calculate a recovery time corresponding to journal data stored in the journal buffer JB based on the journal time corresponding to the journal log (S130). For example, whenever a journal log is generated, the memory controller 110 may calculate a journal time corresponding to the journal log, and may calculate a recovery time by accumulating journal times associated with the journal log(s). In addition, when the journal log is generated, the memory controller 110 may update the recovery time by adding the journal time corresponding to the journal log to the previously calculated recovery time.

The memory controller 110 may determine whether to perform meta writing based on the recovery time, and may perform meta writing if the recovery time is greater than or equal to a threshold value (S140). Here, the threshold value may be a desired and/or preset threshold time, and as described with reference to FIG. 8, the threshold time may be set based on the meta loading time, but the example embodiments are not limited thereto. The threshold time may be shorter than the meta loading time, but is not limited thereto. The memory controller 110 may write one of the plurality of meta data blocks and journal data to the non-volatile memory 120, etc.

Thereafter, operations S120 to S140 may be repeatedly performed, and in the event of occurrence of an SPO, one of a plurality of meta data blocks and journal data may be stored in the non-volatile memory 120, and then the operation may be terminated, but the example embodiments are not limited thereto.

In this way, the memory controller 110 may generate a journal log in response to an update of the meta data, calculate the recovery time corresponding to the journal data based on the journal times of the generated journal logs, and determine whether to perform meta writing based on the recovery time.

Figure 13:
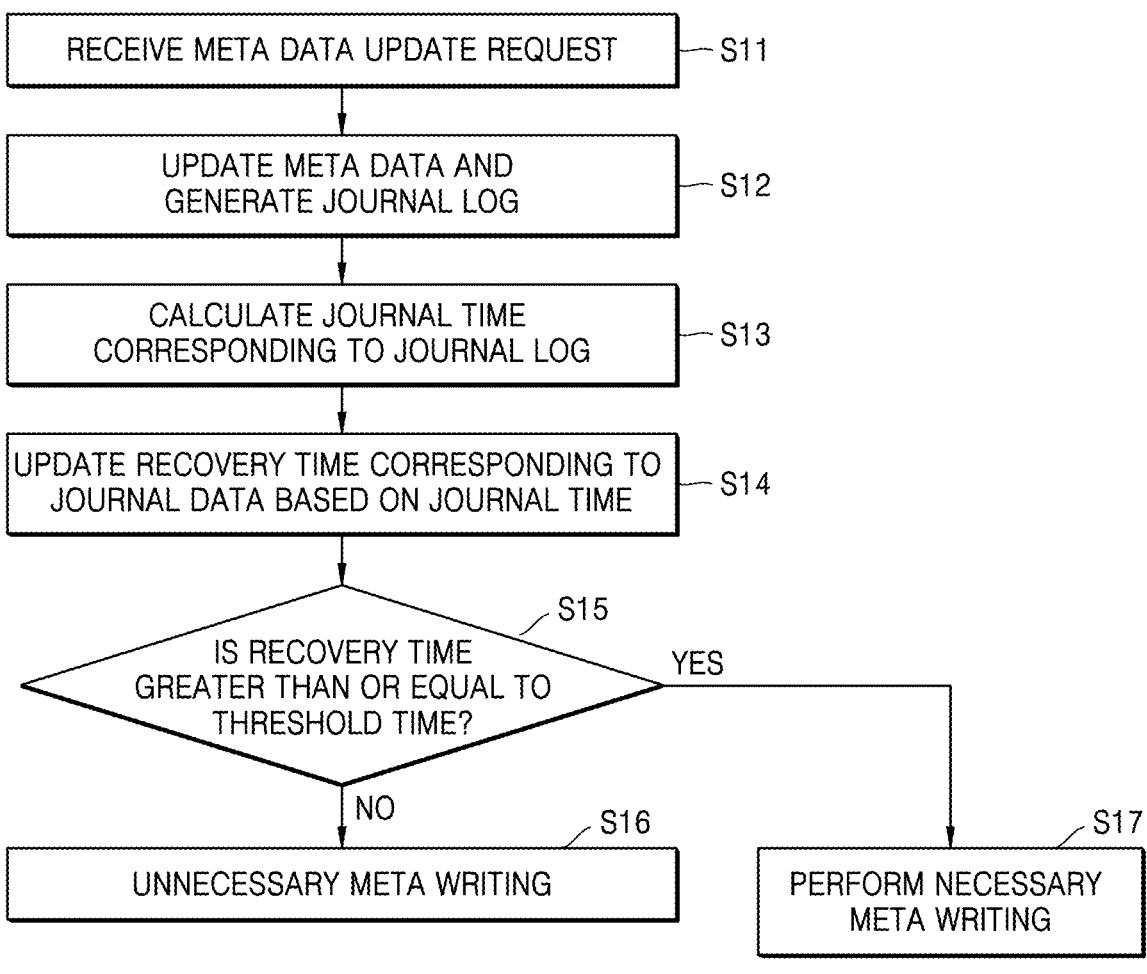
FIG. 13 is a flowchart illustrating a method of determining whether to perform meta writing, according to at least one example embodiment.

FIG. 13 is a flowchart illustrating a method of determining whether to perform meta writing, according to at least one example embodiment. The operating method according to the at least one example embodiment may correspond to a method of managing meta data blocks and journal data and performing meta writing during a run-time of a storage device (e.g., storage device 100 in FIG. 1), but the example embodiments are not limited thereto. The operating method according to at least one example embodiment may include, for example, operations performed in time series in the meta data management module 11 and the journal data management module 12 of the memory controller 110 of FIG. 1, but the example embodiments are not limited thereto. For example, the meta data management module 11 and the journal data management module 12 may be implemented as one firmware executed by hardware or hardware only, and may be referred to as a management module, but the example embodiments are not limited thereto. The description with reference to FIGS. 1 to 12 may be applied to the at least one example embodiment, and redundant descriptions will be omitted.

Referring to FIG. 13, the management module may receive a meta data update request (S11). The management module may receive information for update, for example, a meta ID, an OP code, and/or an operand, etc., together with a meta data update command. The management module may update meta data based on the update information and generate a journal log including the update information (S12).

The management module may calculate a journal time corresponding to the journal log (S13). The journal time represents the predicted time (e.g., estimated time, calculated time, etc.) to recover meta data based on the journal log as the journal log is replayed. The management module may calculate the journal time based on update information included in the journal log. In at least one example embodiment, the management module may calculate a journal time based on a length of meta data, a type of buffer memory, and/or an operation type, etc., but is not limited thereto. The management module may calculate the journal time $T_{JL}$ based on Equation 1, but the example embodiments are not limited thereto.

$$T_{JL} = \frac{L_{META}}{L_{META}} \times t_{MEM} \times N_{ACCESS} \qquad \text{[Equation 1]}$$

Here, $L_{META}$ represents a length of meta data, and $L_{WIDTH}$ represents an access unit of the buffer memory 130.

$$\frac{L_{META}}{L_{WIDTH}}$$

may indicate the number of times accessing the buffer memory according to and/or based on the length of the meta data. $t_{MEM}$ represents the access latency according to and/or based on the type of buffer memory, and $N_{ACCESS}$ represents the number of times accessing the buffer memory according to and/or based on the operation type, which may be obtained based on the OP codes included in the journal log.

When meta data is stored in the same buffer memory 130, $L_{WIDTH}$ has a fixed value, and $t_{MEM}$ may vary depending on the type of buffer memory, e.g., whether the buffer memory is DRAM or SRAM, etc. For example, the access latency of SRAM may be much shorter than that of DRAM, etc. The management module may store $L_{WIDTH}$ and $t_{MEM}$ according to and/or based on the buffer memory, and $N_{ACCESS}$ corresponding to the plurality of OP codes, and when a journal log is generated, a journal time $T_{JL}$ may be calculated based on the OP code included in the journal log, length of meta data, the type of the buffer memory, and/or the access unit of the buffer memory, etc.

The management module may update the recovery time based on the journal time (S14). The management module may calculate the recovery time corresponding to journal data including journal logs (e.g., journal entries), that is, the total journal time of all journal logs, by accumulating journal time corresponding to the journal log each time a journal log is generated. Accordingly, when a first journal log is generated in operation S12, the management module may calculate a first journal time corresponding to a first journal log in operation S13, and update the recovery time by adding the first journal time to the previously calculated recovery time in operation S14. Accordingly, a recovery time corresponding to journal data including the first journal log, etc., may be calculated.

The management module compares the recovery time with the threshold time (S15), and when the recovery time is less than the threshold time, the management module may determine that meta writing performance is not desired and/or necessary (S16). When the recovery time thereof is greater than or equal to the threshold time, the management module may determine to perform meta writing (S17). When meta writing is performed, the journal buffer JB of FIG. 2 may be flushed, and the journal buffer may be empty. The management module may initialize the recovery time. For example, the recovery time may be reset to "0".

Figure 14:
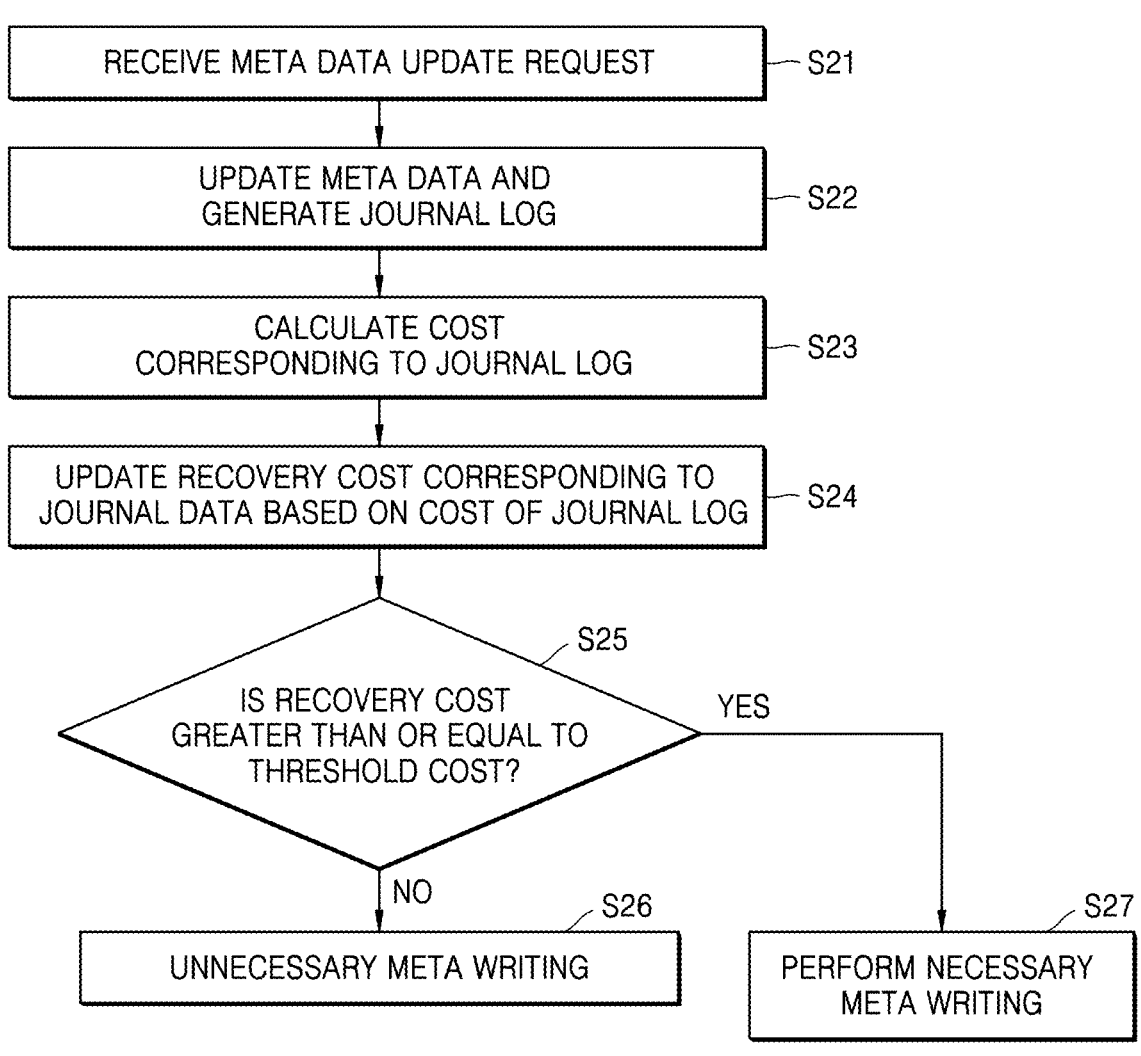
FIG. 14 is a flowchart illustrating a method of determining whether to perform meta writing, according to at least one example embodiment.

FIG. 14 is a flowchart illustrating a method of determining whether to perform meta writing, according to at least one example embodiment. The operating method according to the at least one example embodiment may correspond to a method of managing meta data blocks and journal data and performing meta writing during a run-time of a storage device (e.g., storage device 100 in FIG. 1). The operating method according to the at least one example embodiment is a modified example of the operating method of FIG. 13, and thus, redundant descriptions thereof will be omitted.

Referring to FIG. 14, the management module may receive a meta data update request (S21). The management module may update meta data based on the update information and/or generate a journal log including the update information, etc. (S22).

The management module may calculate a cost corresponding to the journal log (S23). Here, the cost represents a value obtained by normalizing journal times based on the smallest journal time from among journal times of journal logs, but the example embodiments are not limited thereto. In other words, the cost means the normalized journal time according to at least one example embodiment.

In at least one example embodiment, the management module may include a cost table and calculate a cost corresponding to the journal log based on the cost table, etc.

FIG. 15 illustrates a cost table according to at least one example embodiment.

The cost table may include a cost corresponding to a plurality of types of journal logs (e.g., journal entries, etc.).

Referring to FIG. 15, the cost table may include OP codes, meta data types, meta data lengths $L_{META}$, access lengths $L_{WIDTH}$, and/or costs for the first to fifth types of journal logs JNLa to JNLe, etc., but the example embodiments are not limited thereto.

Here, "store" represented by the OP code refers to updating one value of meta data, "BitSet" refers to setting 1-bit, "BitClear" refers to clearing 1-bit, and "Trim" refers to setting or clearing bits within a specific range, but the example embodiments are not limited thereto.

The physical page number "PPN" represented by the type of meta data represents a L2P table value, the Initial Vth Shift "IVS" represents the reliability information for each page, the Invalid Bit Map "IBM" represents the bitmap of whether the L2P table is valid, and the Valid Page Bitmap "VPB" represents the bitmap of whether the physical page is valid, but the example embodiments are not limited thereto. The access length $L_{WIDTH}$ represents an access unit of the buffer memory 130. "IBM_start" represents the start address of the bitmap indicating whether the L2P Table is valid, and "IBM_end" represents the end address of the bitmap.

The management module may obtain (and/or calculate) the cost corresponding to the journal log by checking the OP code, meta ID, and/or operands included in the journal log, and accessing the cost table based on the OP code, meta ID, and/or operands, etc. For example, if the OP code of the journal log represents "store" and the type of meta data corresponding to the meta data ID represents "IVS", the journal log may be determined as a second type of journal log JNLb and the cost of the journal log may be calculated as 1. For example, if the OP code of the journal log represents "Trim", the journal log may be determined as a fifth type of journal log JNLe, and if the address range of "IBM_start" to "IBM_end" represents 512 bits, 8 obtained by dividing 512 by 32 bits, which is an access length, may be calculated as the cost of the journal log.

In at least one example embodiment, the management module may calculate the cost corresponding to the journal log by multiplying the coefficient according to and/or based on the type of buffer memory by the cost of the cost table. For example, "1" may be set for DRAM, and "0,1" may be set for SRAM, but are not limited thereto. The cost table may be generated in response to a case where the buffer memory is DRAM, and the management module may calculate cost values corresponding to journal logs by multiplying the cost values of the cost table by "0,1" when the buffer memory is SRAM, but are not limited thereto.

Subsequently, referring to FIG. 14, the management module may update the recovery cost of journal data based on the cost of the journal log (S24). The management module may calculate the recovery time corresponding to journal data including journal logs, that is, the total cost of all journal logs, by accumulating the journal costs corresponding to the journal log each time the journal log is generated. The recovery cost may refer to the normalized recovery time, but is not limited thereto.

When a first journal log is generated in operation S22, the management module may calculate a first cost corresponding to the first journal log in operation S23, and update the recovery cost by adding the first cost to the previously calculated recovery cost in operation S24. Accordingly, a recovery cost of journal data including the first journal log may be calculated.

The management module compares the recovery cost with the threshold cost (e.g., desired threshold cost) (S25), and when the recovery cost is less than the threshold cost (wherein the desired threshold cost may be a normalized cost), the management module may determine that meta writing performance is not desired and/or necessary (S26), but the example embodiments are not limited thereto. When the recovery cost is greater than or equal to the threshold cost, the management module may determine to perform meta writing (S27). When meta writing is performed, the journal buffer JB of FIG. 2 may be flushed, and the journal buffer may be empty. The management module may then initialize the recovery cost. For example, the recovery cost may be reset to "0".

Figure 16:
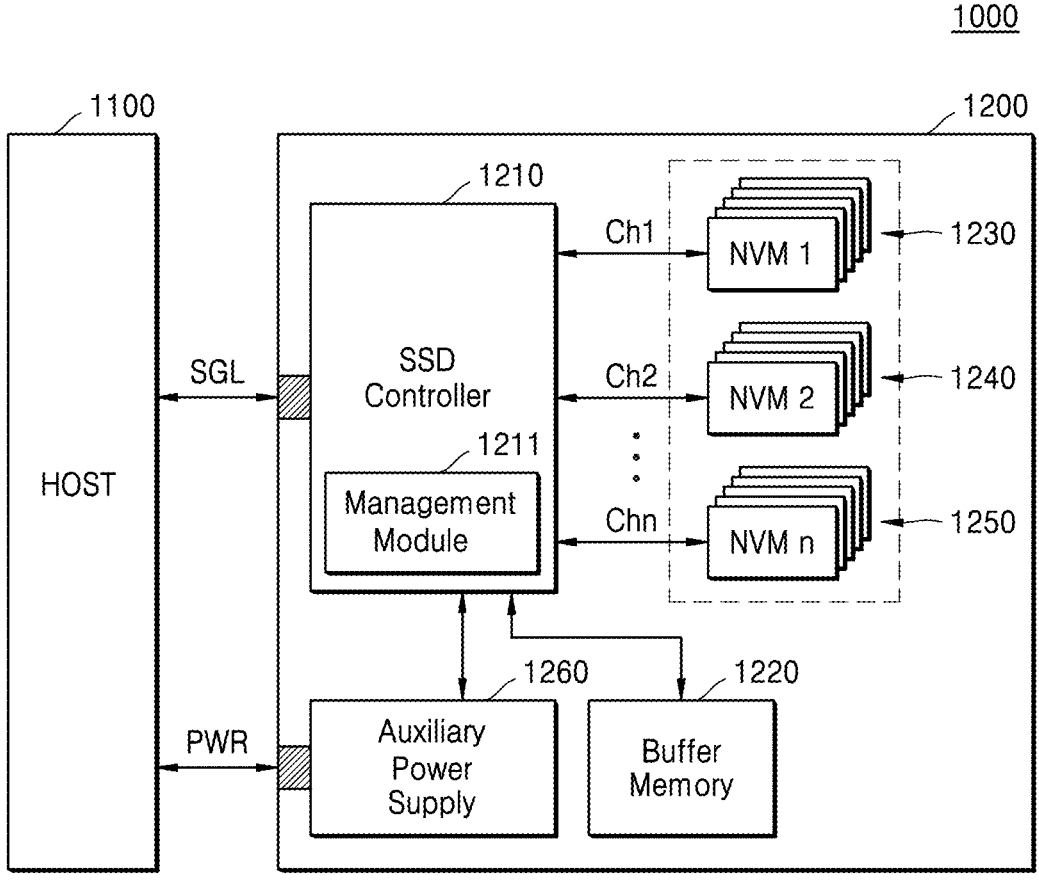
FIG. 16 is a block diagram illustrating a solid state device (SSD) system according to at least one example embodiment.

FIG. 16 is a block diagram illustrating a solid state device (SSD) system according to at least one example embodiment.

Referring to FIG. 16, the SSD system 1000 may include at least one host 1100 (e.g., host device) and/or at least one SSD 1200, etc., but the example embodiments are not limited thereto. The SSD 1200 may exchange signals SGL with the host 1100 through a signal connector and receive power PWR through a power connector. The SSD 1200 may include an SSD controller 1210, a plurality of memory devices 1230, 1240, and 1250, a buffer memory 1220, and/or an auxiliary power supply device 1260, etc., but is not limited thereto.

The SSD controller 1210 may transmit and/or receive the signal SGL to and/or from the host 1100 through the signal connector. Here, the signal SGL may include a command, an address, data, and the like. The SSD controller 1210 may write data to a corresponding memory device and/or read data from the corresponding memory device according to and/or based on a command of the host 1100, etc.

The storage device 100 of FIG. 1 may be applied to the SSD 1200. The management module 1211 provided in the SSD controller 1210 may manage meta data and/or journal data. Functions of the meta data management module 11 and/or the journal management module 12 of FIG. 1 may be applied to the management module 1211, but the example embodiments are not limited thereto. The management module 1211 may update meta data, generate a journal log in response to an update of the meta data, and/or store the meta data and the journal log in the buffer memory 1220, etc. In addition, the management module 1211 may determine whether to perform meta writing based on the recovery time corresponding to the journal data including the journal logs stored in the journal buffer, that is, the entire journal time of the journal logs, etc. When the recovery time is equal to or greater than a threshold time, the SSD controller 1210 may store one of the plurality of meta data blocks stored in the buffer memory 1220 and/or the journal data in one of the plurality of memory devices 1230, 1240, and/or 1250, etc. According to some example embodiments, the SSD controller 1210 and/or the management module 1211 etc., may be implemented as processing circuitry. The processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The plurality of memory devices 1230, 1240, and 1250 may be used as storage media of the SSD 1200, but is not limited thereto. The SSD 1200 may be a flash memory device. However, the example embodiments are not limited thereto, and in addition to the flash memory, non-volatile memory devices such as PRAM, MRAM, ReRAM, and FRAM, etc., may be used as the plurality of memory devices 1230, 1240, and 1250, etc. The plurality of memory devices 1230, 1240, and 1250 may be connected to the SSD controller 1210 through a plurality of channels Ch1 to Chn. One or more flash memories may be connected to one channel. The flash memories connected to one channel may be connected to the same data bus.

The buffer memory 1220 may temporarily store data written to the plurality of memory devices 1230, 1240, and 1250, and/or data read from the plurality of memory devices 1230, 1240, and 1250, etc. In addition, the buffer memory 1220 may store the plurality of meta data blocks and/or the journal data. The buffer memory 1220 may be implemented as a volatile memory such as DRAM and SRAM, and/or a non-volatile memory such as PRAM, MRAM, ReRAM, and FRAM, but the example embodiments are not limited thereto.

The auxiliary power supply device 1260 may be connected to the host 1100 through a power connector. The auxiliary power supply device 1260 may receive the power PWR from the host 1100 and charge the same. Meanwhile, the auxiliary power supply device 1260 may be located in the SSD 1200 or may be located outside the SSD 1200. For example, the auxiliary power device 1260 is located on a main board and may provide auxiliary power to the SSD 1200.

Meanwhile, the storage system according to the example embodiments of the inventive concepts may be mounted and/or applied not only to the SSD system 1200 but also to the memory card system, the computing system, the UFS, and the like.

Figure 17:
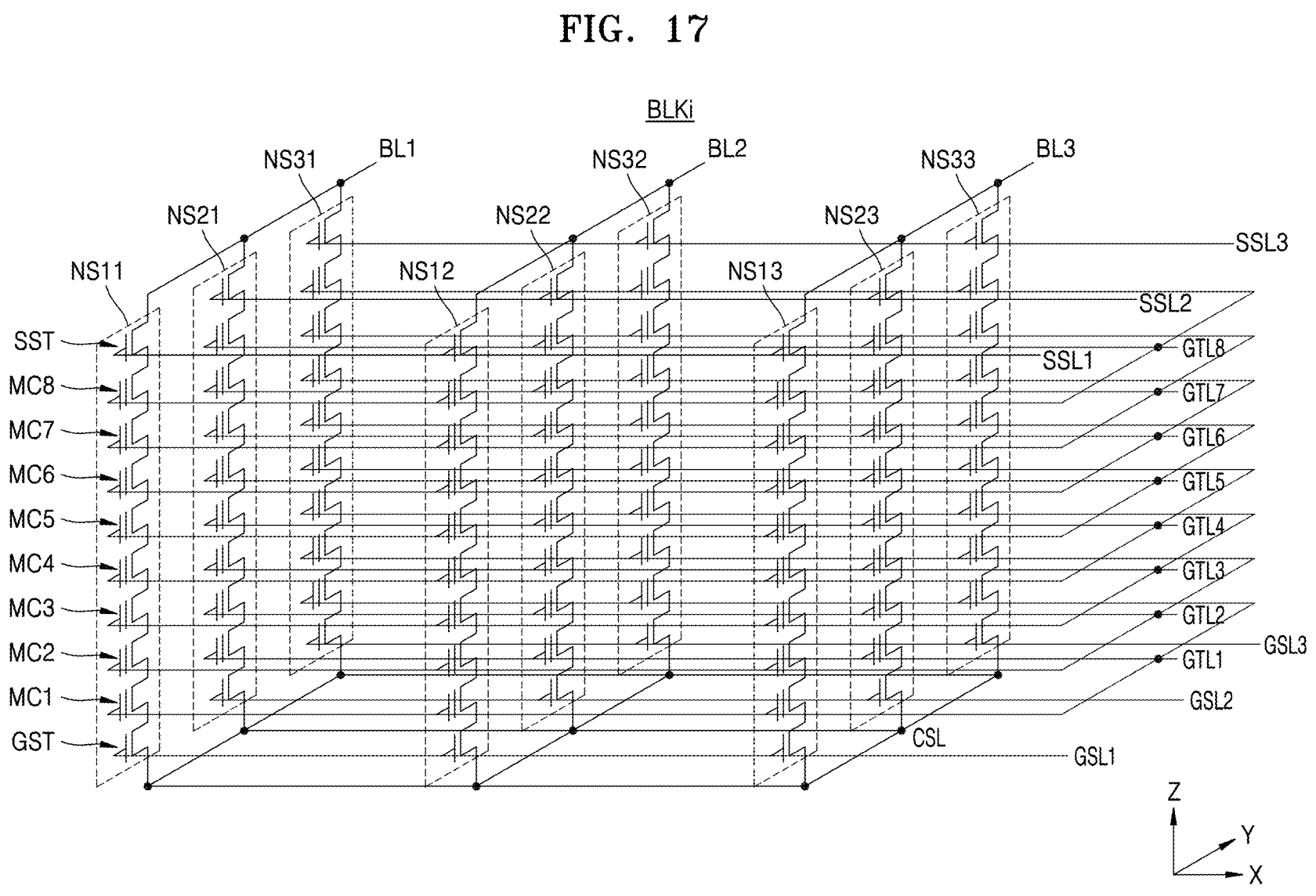

FIG. 17 is a diagram illustrating a 3D VNAND structure applicable to a storage device according to at least one example embodiment. When a storage device is implemented as a 3D vertical NAND (VNAND) type flash memory of a non-volatile memory (e.g., 120 of FIG. 1), each of the plurality of memory blocks may be represented by an equivalent circuit as shown in FIG. 17, but the example embodiments are not limited thereto. The memory blocks BLKi illustrated in FIG. 17 represent three-dimensional memory blocks formed in a three-dimensional structure on a substrate. For example, a plurality of memory NAND strings included in the memory blocks BLKi may be formed in a direction perpendicular to the substrate.

Referring to FIG. 17, the memory block BLKi may include a plurality of memory NAND strings NS11 to NS33 connected between bit lines BL1, BL2, and BL3 and a common source line CSL, but the example embodiments are not limited thereto. Each of the plurality of memory NAND strings NS11 to NS33 may include a string selection transistor SST, a plurality of memory cells MC1, MC2, . . . , and MC8, and a ground selection transistor GST. Although FIG. 17 illustrates that each of the plurality of memory NAND strings NS11 to NS33 includes eight memory cells MC1, MC2, . . . , and MC8, the example embodiments are not limited thereto.

The string selection transistor SST may be connected to corresponding string selection lines SSL1, SSL2, and SSL3, etc. The plurality of memory cells MC1, MC2, . . . , and MC8 may be connected to corresponding gate lines GTL1, GTL2, . . . , and GTL8, respectively, but the example embodiments are not limited thereto. Gate lines GTL1, GTL2, . . . , and GTL8 may correspond to word lines, and some of the gate lines GTL1, GTL2, . . . , and GTL8 may correspond to dummy word lines. The ground selection transistor GST may be connected to the corresponding ground selection lines GSL1, GSL2, and GSL3. The string selection transistor SST may be connected to the corresponding bit lines BL1, BL2, and BL3, and the ground selection transistor GST may be connected to the common source line CSL.

Word lines of the same height are commonly connected, and the ground selection lines GSL1, GSL2, and GSL3 and the string selection lines SSL1, SSL2, and SSL3 may be separated from each other. FIG. 17 shows that the memory block BLK is connected to eight gate lines GTL1, GTL2, . . . , and GTL8 and three bit lines BL1, BL2, and BL3, but the example embodiments are not limited thereto.

Figure 18:
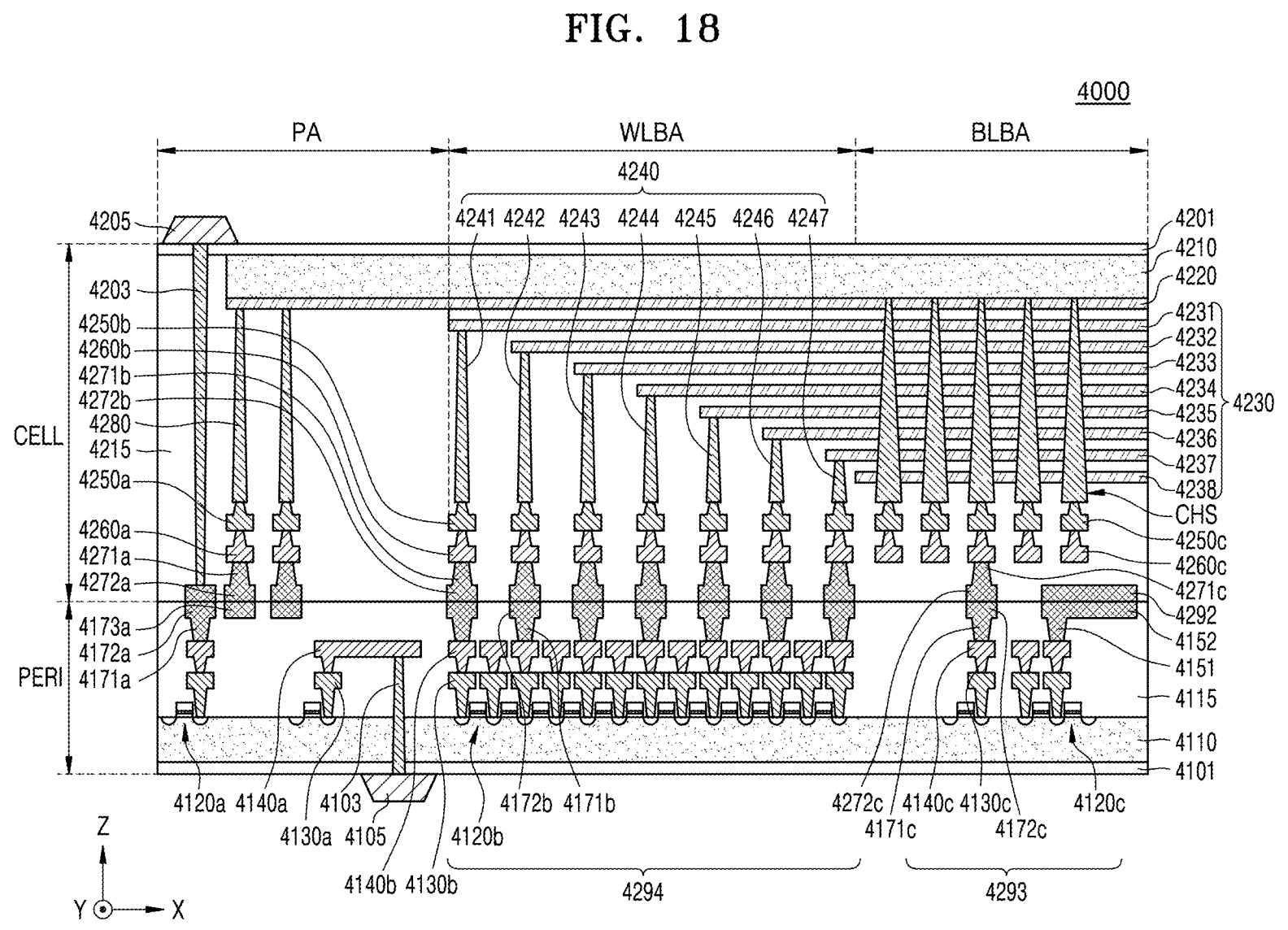

FIG. 18 is a diagram illustrating a B-VNAND structure applicable to a storage device according to at least one example embodiment.

When the non-volatile memory included in the storage device is implemented as a Bonding Vertical NAND (B-VNAND) type flash memory, the non-volatile memory may have the structure shown in FIG. 18, but the example embodiments are not limited thereto.

Referring to FIG. 18, the memory device 4000 may have a chip to chip (C2C) structure, but is not limited thereto. The C2C structure may refer to manufacturing an upper chip including a cell area CELL on a first wafer, manufacturing a lower chip including a peripheral circuit area PERI on a second wafer different from the first wafer, and then connecting the upper chip and the lower chip to each other by bonding. For example, the bonding method may refer to a method of electrically connecting a bonding metal formed on the top metal layer of the upper chip with a bonding metal formed on the top metal layer of the lower chip. For example, when the bonding metal is formed of copper (Cu), the bonding method may be a Cu—Cu bonding method, and the bonding metal may be formed of aluminum and/or tungsten, etc., but the example embodiments are not limited thereto.

Each of the peripheral circuit area PERI and the cell area CELL of the memory device 4000 may include an external pad bonding area PA, a word line bonding area WLBA, and/or a bit line bonding area BLBA, etc.

The peripheral circuit area PERI may include a first substrate 4110, an interlayer insulating layer 4115, a plurality of circuit elements 4120a, 4120b, and 4120c formed on the first substrate 4110, first metal layers 4130a, 4130b, and 4130c respectively connected to the plurality of circuit elements 4120a, 4120b, and 4120c, and second metal layers 4140a, 4140b, and 4140c respectively formed on the first metal layers 4130a, 4130b, and 4130c, but the example embodiments are not limited thereto. In at least one example embodiment, the first metal layers 4130a, 4130b, and 4130c may be formed of tungsten having relatively high resistance, and the second metal layers 4140a, 4140b, and 4140c may be formed of copper having relatively low resistance, but are not limited thereto.

Although only the first metal layers 4130a, 4130b, and 4130c and the second metal layers 4140a, 4140b, and 4140c are illustrated, the example embodiments are not limited thereto, and at least one metal layer may be further formed on the second metal layers 4140a, 4140b, and 4140c. At least some of the one or more metal layers formed on the upper portions of the second metal layers 4140a, 4140b, and 4140c may be formed of aluminum having lower resistance than copper forming the second metal layers 4140a, 4140b, and 4140c, but are not limited thereto.

The interlayer insulating layer 4115 may be arranged on the first substrate 4110 to cover the plurality of circuit devices 4120a, 4120b, and 4120c, the first metal layers 4130a, 4130b, and 4130c, and the second metal layers 4140a, 4140b, and 4140c and may include an insulating material such as silicon oxide, silicon nitride, or the like.

Lower bonding metals 4171b and 4172b may be formed on the second metal layer 4140b in the word line bonding area WLBA. In the word line bonding area WLBA, the lower bonding metals 4171b and 4172b of the peripheral circuit area PERI may be electrically connected with the upper bonding metals 4271b and 4272b of the cell area CELL, each other by a bonding method, and the lower bonding metals 4171b and 4172b and the upper bonding metals 4271b and 4272b may be formed of aluminum, copper, tungsten, or the like.

The cell area CELL may provide at least one memory block. The cell area CELL may include a second substrate 4210 and a common source line 4220, but is not limited thereto. On the second substrate 4210, a plurality of word lines 4231 to 4238 collectively denoted as 4230 may be stacked in a direction (e.g., Z-axis direction) perpendicular to the top surface of the second substrate 4210. String selection lines and ground selection lines may be arranged on each of the upper and lower portions of the word lines 4230, and the plurality of word lines 4230 may be arranged between the string selection lines and the ground selection lines.

In the bit line bonding area BLBA, a channel structure CHS may extend in a direction perpendicular to the top surface of the second substrate 4210 to penetrate word lines 4230, string selection lines, and ground selection lines. The channel structure CHS may include a data storage layer, a channel layer, a buried insulating layer, and the like, and the channel layer may be electrically connected to a first metal layer 4250*c* and a second metal layer 4260*c*, but the example embodiments are not limited thereto. For example, the first metal layer 4250*c* may be a bit line contact, and the second metal layer 4260*c* may be a bit line, etc. In at least one example embodiment, the second metal layer, that is, the bit line 4260*c* may extend in a first direction (e.g., Y-axis direction) parallel to the top surface of the second substrate 4210.

In at least one example embodiment illustrated in FIG. 18, an area in which the channel structure CHS, the bit line 4260*c*, and the like are arranged may be defined as the bit line bonding area BLBA. In the bit line bonding area BLBA, the bit line 4260*c* may be electrically connected to the circuit elements 4120*c* which provide a page buffer 4293 in the peripheral circuit area PERI. For example, the bit line 4260*c* may be connected to the upper bonding metals 4271*c* and 4272*c* in the peripheral circuit area PERI, and the upper bonding metals 4271*c* and 4272*c* may be connected to the lower bonding metals 4171*c* and 4172*c* connected to the circuit elements 4120*c* of the page buffer 4293, but are not limited thereto.

In the word line bonding area WLBA, the word lines 4230 may extend in a second direction (e.g., X-axis direction) parallel to the top surface of the second substrate 4210, and may be connected to a plurality of cell contact plugs 4241 to 4247 collectively denoted as 4240. The word lines 4230 and the cell contact plugs 4240 may be connected to each other in pads provided by extending at least some of the word lines 4230 to different lengths in the second direction. A first metal layer 4250*b* and a second metal layer 4260*b* may be sequentially connected to upper portions of the cell contact plugs 4240 connected to the word lines 4230. The cell contact plugs 4240 may be connected to the peripheral circuit area PERI through the upper bonding metals 4271*b* and 4272*b* of the cell area CELL and the lower bonding metals 4171*b* and 4172*b* of the peripheral circuit area PERI in the word line bonding area WLBA, but are not limited thereto.

The cell contact plugs 4240 may be electrically connected to the circuit elements 4120*b* providing a row decoder 4294 in the peripheral circuit area PERI. In at least one example embodiment, the operating voltages of the circuit elements 4120*b* providing the row decoder 4294 may be different from the operating voltages of the circuit elements 4120*c* providing the page buffer 4293, but the example embodiments are not limited thereto. For example, the operating voltages of the circuit elements 4120*c* providing the page buffer 4293 may be greater than the operating voltages of the circuit elements 4120*b* providing the row decoder 4294, but are not limited thereto.

Common source line contact plugs 4280 may be arranged in the external pad bonding area PA. The common source line contact plugs 4280 are formed of a conductive material such as a metal, a metal compound, and/or polysilicon, etc., and may be electrically connected to the common source line 4220. The first metal layer 4250*a* and the second metal layer 4260*a* may be sequentially stacked on each of the common source line contact plugs 4280, etc. For example, an area in which the common source line contact plugs 4280, the first metal layer 4250*a*, and the second metal layer 4260*a* are arranged may be defined as the external pad bonding area PA, etc.

Meanwhile, input/output pads 4105 and 4205 may be arranged in the external pad bonding area PA. Referring to FIG. 18, a lower insulation layer 4101 covering the bottom surface of the first substrate 4110 may be formed under the first substrate 410, and a first input/output pad 4105 may be formed on the lower insulation layer 4101, but the example embodiments are not limited thereto. The first input/output pad 4105 may be connected to at least one of the plurality of circuit elements 4120*a*, 4120*b*, and 4120*c* arranged in the peripheral circuit area PERI through a first input/output contact plug 4103, and may be separated from the first substrate 4110 by the lower insulating layer 4101, but is not limited thereto. In addition, a side insulating layer is arranged between the first input/output contact plug 4103 and the first substrate 4110, so that the first input/output contact plug 4103 and the first substrate 4110 may be electrically separated from each other, but the example embodiments are not limited thereto.

An upper insulating layer 4201 covering the top surface of the second substrate 4210 may be formed on the second substrate 4210 and a second input/output pad 4205 may be arranged on the upper insulating layer 4201. The second input/output pad 4205 may be connected to at least one of the plurality of circuit elements 4120*a*, 4120*b*, and 4120*c* arranged in the peripheral circuit area PERI through the second input/output contact plug 4203.

According to some example embodiments, the second substrate 4210, the common source line 4220, and the like may not be arranged in the area where the second input/output contact plug 4203 is arranged, but the example embodiments are not limited thereto. In addition, the second input/output pad 4205 may not overlap the word lines 4230 in the third direction (e.g., Z-axis direction). Referring to FIG. 18, the second input/output contact plug 4203 may be separated from the second substrate 4210 in a direction parallel to the top surface of the second substrate 4210 and connected to the second input/output pad 4205 through the interlayer insulating layer 4215 of the cell area CELL, but the example embodiments are not limited thereto.

According to some example embodiments, the first input/output pad 4105 and the second input/output pad 4205 may be selectively formed. For example, the memory device 4000 may include only the first input/output pad 4105 placed above the first substrate 4110 and/or only the second input/output pad 4205 placed above the second substrate 4210. Additionally, the memory device 4000 may include both the first input/output pad 4105 and the second input/output pad 4205, but is not limited thereto.

A metal pattern of an uppermost metal layer may exist as a dummy pattern and/or the uppermost metal layer may be empty in each of the external pad bonding area PA and the bit line bonding area BLBA included in each of the cell area CELL and the peripheral circuit area PERI, etc.

In the memory device 4000, in the external pad bonding area PA, a lower metal pattern 4176*a* having the same shape as the upper metal pattern 4272*a* in the cell area may be formed in the uppermost metal layer in the peripheral circuit area PERI in correspondence to the upper metal pattern 4272*a* formed in the uppermost metal layer in the cell area, but the example embodiments are not limited thereto. The lower metal pattern 4176*a* formed on the uppermost metal layer in the peripheral circuit area PERI may not be connected to a separate contact in the peripheral circuit area PERI. Similarly, in the external pad bonding area PA, the upper metal pattern of the same shape as the lower metal pattern in the peripheral circuit area PERI may be formed on the upper metal layer in the cell area CELL in correspondence to the lower metal pattern formed on the uppermost metal layer in the peripheral circuit area PERI, but is not limited thereto.

The lower bonding metals 4171*b* and 4172*b* may be formed on the second metal layer 4140*b* in the word line bonding area WLBA. In the word line bonding area WLBA, the lower bonding metals 4171*b* and 4172*b* in the peripheral circuit area PERI may be electrically connected to the upper bonding metals 4271*b* and 4272*b* in the cell area CELL by a bonding method, etc.

In addition, in the bit line bonding area BLBA, an upper metal pattern 4292 of the same shape as the lower metal pattern 4152 in the peripheral circuit area PERI may be formed on the uppermost metal layer in the cell area CELL in correspondence to the lower metal pattern 4152 formed on the uppermost metal layer in the peripheral circuit area PERI, but the example embodiments are not limited thereto. A contact may not be formed on the upper metal pattern 4292 formed on the uppermost metal layer in the cell area CELL.

It should be understood that the various example embodiments described herein should be considered in a descriptive sense only and not for purposes of limitation. Descriptions of features or aspects within each example embodiment should typically be considered as available for other similar features and/or aspects in other example embodiments. While one or more example embodiments have been described with reference to the figures, it will be understood by those of ordinary skill in the art that various changes in form and details may be made therein without departing from the spirit and scope as defined by the following claims.

What is claimed is:

1. A storage device comprising:
a non-volatile memory device;
a buffer memory configured to store a plurality of meta data blocks and journal data corresponding to the plurality of meta data blocks, the plurality of meta data blocks including meta data for managing the non-volatile memory device, and the journal data includes a plurality of journal entries indicating update information on the meta data included in one of the plurality of meta data blocks, each of the plurality of journal entries being one of a plurality of journal types, each of the plurality of journal types having a different journal time; and
a memory controller configured to,
determine a recovery time of the plurality of meta data blocks based on the journal times corresponding to the journal types of each of the journal entries and a coefficient determined based on a buffer memory type of the buffer memory, the recovery time being a predicted time for recovering the plurality of meta data blocks using the journal data, and
perform a meta writing based on the recovery time, the meta writing including writing one of the plurality of meta data blocks to the non-volatile memory device and writing the journal data to the non-volatile memory device.

2. The storage device of claim 1, wherein the memory controller is further configured to:
perform the meta writing in response to the recovery time being greater than or equal to a threshold value.

3. The storage device of claim 2, wherein
the threshold value is less than a meta loading time for loading the meta data block and the journal data corresponding to the meta data block from the non-volatile memory device to the buffer memory in response to the storage device being powered on, and
the meta data block and the journal data corresponding to the meta data block are stored in the non-volatile memory device.

4. The storage device of claim 1, wherein the memory controller is further configured to:
load a first meta data block and first journal data stored in the non-volatile memory device to the buffer memory while performing a first meta writing operation during a first time period in response to the storage device being powered-on;
load a second meta data block and second journal data stored in the non-volatile memory device to the buffer memory while performing a second meta writing operation during a second time period following the first time period; and
recover the meta data blocks loaded into the buffer memory based on the first journal data during the second time period.

5. The storage device of claim 4, wherein a time for recovering the meta data blocks loaded into the buffer memory based on the first journal data is less than or equal to a time for the second meta data block and the second journal data to be loaded into the buffer memory.

6. The storage device of claim 1, wherein the memory controller is further configured to:
calculate a first journal time corresponding to a first journal entry including update information of a first meta data in response to the first meta data being updated; and
update the recovery time by accumulating the first journal time with the recovery time.

7. The storage device of claim 6, wherein the memory controller is further configured to:
calculate the first journal time based on at least one of a length of the first meta data, an access latency corresponding to the buffer memory type of the buffer memory, and a memory operation type determined based on an operation code included in the first journal entry.

8. The storage device of claim 7, wherein the memory controller is further configured to:
calculate a number of times the buffer memory was accessed for recovering the first meta data based on the length of the first meta data and the memory operation type; and
calculate the first journal time by multiplying the access latency by the number of times.

9. The storage device of claim 8, wherein the memory controller is further configured to:
calculate a recovery cost based on the number of times the buffer memory was accessed and the coefficient, the buffer memory type of the buffer memory determined based on an operation type indicated by the operation code included in the first journal entry.

10. The storage device of claim 1, wherein the memory controller is further configured to:
calculate a recovery cost corresponding to the recovery time, the calculating including accumulating the recovery cost calculated for a journal entry each time the meta data was updated, wherein the recovery cost is a normalized value of the journal time of the journal entry.

11. A memory controller for controlling a non-volatile memory device, the memory controller comprising:
processing circuitry configured to, update first meta data included in at least one of a plurality of meta data blocks based on at least one memory operation performed by the non-volatile memory device;

generate a first journal entry including update information in response to the updating of the first meta data;

update a recovery time based on a first journal time corresponding to the first journal entry and a coefficient determined based on a buffer memory type of a buffer memory, the first journal time based on a first journal type of a plurality of journal types corresponding to the first journal entry, each of the plurality of journal types having a different journal time, the recovery time being a predicted time for recovering the plurality of meta data blocks based on journal data including a plurality of journal entries; and perform meta writing in response to the updated recovery time reaching a threshold value, the meta writing including writing one of the plurality of meta data blocks stored in the buffer memory and the journal data to the non-volatile memory device.

12. The memory controller of claim 11, wherein the threshold value is less than a meta loading time for loading the meta data block and journal data corresponding to the meta data block from the non-volatile memory device to the buffer memory in response to the non-volatile memory device being powered on, the meta data block and the journal data corresponding to the meta data block being stored in the non-volatile memory device.

13. The memory controller of claim 11, wherein the processing circuitry is further configured to:

recover the plurality of meta data blocks loaded into the buffer memory based on the journal data loaded into the buffer memory before a first meta loading time, the first meta loading time being a time during which a first meta data block stored in the non-volatile memory device is loaded into the buffer memory in response to a power-on event of the non-volatile memory device.

14. The memory controller of claim 11, wherein the processing circuitry is further configured to:

calculate the first journal time corresponding to the first meta data based on the first journal entry; and update the recovery time by adding the first journal time to the recovery time.

15. The memory controller of claim 11, wherein the processing circuitry is further configured to:

calculate a number of times the buffer memory was accessed based on a length of the first meta data and a memory operation type, the memory operation type determined based on an operation code included in the first meta data; and calculate the first journal time by multiplying an access latency corresponding to the buffer memory type of the buffer memory by the number of times.

16. The memory controller of claim 11, wherein the processing circuitry is further configured to:

calculate the recovery time by accumulating a normalization value of a default estimated recovery time of the meta data whenever the meta data is updated.

17. An operating method of a memory controller for controlling a non-volatile memory device, the operating method comprising:

loading a plurality of meta data blocks into a buffer memory;

updating meta data included in at least one of the plurality of meta data blocks;

generating a first journal entry that represents update information corresponding to the updated meta data;

updating a recovery time based on a first journal time corresponding to the first journal entry and a coefficient determined based on a buffer memory type of the buffer memory, the first journal time based on a first journal type of a plurality of journal types corresponding to the first journal entry, each of the plurality of journal types having a different journal time, the recovery time being a predicted time for recovering the plurality of meta data blocks based on journal data including the first journal entry; and writing one of the plurality of meta data blocks to the non-volatile memory device and the journal data to the non-volatile memory device in response to the updated recovery time reaching a threshold value.

18. The operating method of claim 17, wherein the threshold value is less than a meta loading time for loading the meta data block and the journal data corresponding to the meta data block from the non-volatile memory device to the buffer memory in response to the non-volatile memory device being powered on, the meta data block and the journal data being stored in the non-volatile memory device.

19. The operating method of claim 18, further comprising:

calculating the first journal time based on at least one of a length of the meta data, an access latency corresponding to the buffer memory type of the buffer memory, and a memory operation type determined based on an operation code included in the first journal entry.

20. The operating method of claim 17, wherein the updating of the recovery time comprises:

calculating a corrected normalization value as the first journal time by multiplying a normalized journal time by a number of times the buffer memory was accessed according to the first journal entry and the coefficient corresponding to the buffer memory type of the buffer memory.

* * * * *